US 9,126,490 B2

(12) United States Patent
Cook et al.

(10) Patent No.: US 9,126,490 B2
(45) Date of Patent: Sep. 8, 2015

(54) WIRELESS ENERGY TRANSFER VIA COUPLED PARASITIC RESONATORS

(75) Inventors: Nigel P. Cook, El Cajon, CA (US); Hanspeter Widmer, Wohlenschwil (CH); Lukas Sieber, Olten (CH)

(73) Assignee: QUALCOMM Incorporated, San Diego, CA (US)

( * ) Notice: Subject to any disclaimer, the term of this patent is extended or adjusted under 35 U.S.C. 154(b) by 955 days.

(21) Appl. No.: 13/283,387

(22) Filed: Oct. 27, 2011

(65) Prior Publication Data

US 2012/0161696 A1   Jun. 28, 2012

Related U.S. Application Data

(60) Provisional application No. 61/408,508, filed on Oct. 29, 2010.

(51) Int. Cl.
*H02J 7/00* (2006.01)
*H04M 1/00* (2006.01)
(Continued)

(52) U.S. Cl.
CPC .............. *B60L 11/182* (2013.01); *B60L 3/0069* (2013.01); *B60L 3/04* (2013.01); *B60L 11/1829* (2013.01); *B60L 11/1833* (2013.01); *B60L 11/1842* (2013.01); *B60L 11/1844* (2013.01); *B60L 11/1877* (2013.01); *B60L 11/1879* (2013.01); *H02J 5/005* (2013.01); *B60L 2200/12* (2013.01); *B60L 2200/26* (2013.01);
(Continued)

(58) Field of Classification Search
CPC ........................................................ H02J 7/025
USPC ........................................................ 320/108
See application file for complete search history.

(56) References Cited

U.S. PATENT DOCUMENTS 5,821,728 A * 10/1998 Schwind ........................ 320/108
5,821,731 A * 10/1998 Kuki et al. .................... 320/108
(Continued)

FOREIGN PATENT DOCUMENTS

| CN | 101673962 A | 3/2010 |
|---|---|---|
| CN | 101835653 A | 9/2010 |

(Continued)

OTHER PUBLICATIONS

International Search Report and Written Opinion—PCT/US2011/058147—ISA/EPO—Feb. 22, 2012.

*Primary Examiner* — Edward Tso
*Assistant Examiner* — Ahmed Omar
(74) *Attorney, Agent, or Firm* — Knobbe Martens Olson & Bear LLP

(57) ABSTRACT

This disclosure provides systems, methods and apparatus for wirelessly transferring power using parasitic resonators. In one aspect a wireless power receiver apparatus for powering or charging an electric vehicle is provided. The wireless power receiver apparatus includes a receive circuit including a first coil. The receive circuit is configured to wirelessly receive power so as to power or charge or power the electric vehicle. The wireless power receiver apparatus further includes a passive circuit including a second coil. The passive circuit is configured to wirelessly receive power from a transmit circuit including a third coil. The passive circuit is further configured to wirelessly retransmit power received from the transmit circuit to the receive circuit. The wireless power receiver apparatus further includes a controller configured to displace the second coil from the first coil is provided.

37 Claims, 30 Drawing Sheets

(51) Int. Cl.
*B60L 11/18* (2006.01)
*B60L 3/00* (2006.01)
*B60L 3/04* (2006.01)
*H02J 5/00* (2006.01)
*H02J 7/02* (2006.01)

(52) U.S. Cl.
CPC ......... *B60L 2210/30* (2013.01); *B60L 2210/40* (2013.01); *B60L 2230/40* (2013.01); *B60L 2240/36* (2013.01); *H02J 7/025* (2013.01); *Y02E 60/721* (2013.01); *Y02T 10/7005* (2013.01); *Y02T 10/705* (2013.01); *Y02T 10/7088* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 30/12* (2013.01)

(56) References Cited

U.S. PATENT DOCUMENTS

| | | | |
|---|---|---|---|
| 8,248,027 B2 * | 8/2012 | Sakoda et al. | 320/108 |
| 2009/0153098 A1 * | 6/2009 | Toya et al. | 320/108 |
| 2010/0277121 A1 | 11/2010 | Hall et al. | |
| 2011/0062916 A1 | 3/2011 | Farahani | |
| 2011/0133567 A1 | 6/2011 | Teo et al. | |
| 2011/0156487 A1 | 6/2011 | Teo et al. | |
| 2011/0181120 A1 | 7/2011 | Liu et al. | |

FOREIGN PATENT DOCUMENTS

| | | |
|---|---|---|
| EP | 0788212 A2 | 8/1997 |
| EP | 2216870 A2 | 8/2010 |
| EP | 2216878 | 8/2010 |
| JP | 2010173503 A | 8/2010 |
| JP | 2010183811 A | 8/2010 |
| JP | 2011160505 A | 8/2011 |
| WO | WO-2010006078 A1 | 1/2010 |
| WO | WO-2011112795 A1 | 9/2011 |

* cited by examiner

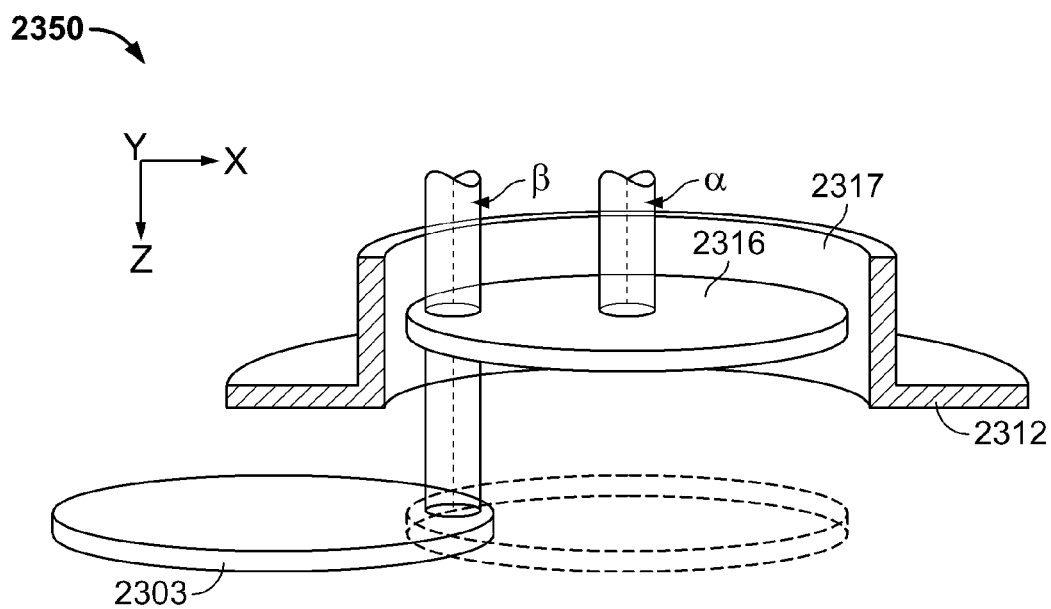
Figure 23A
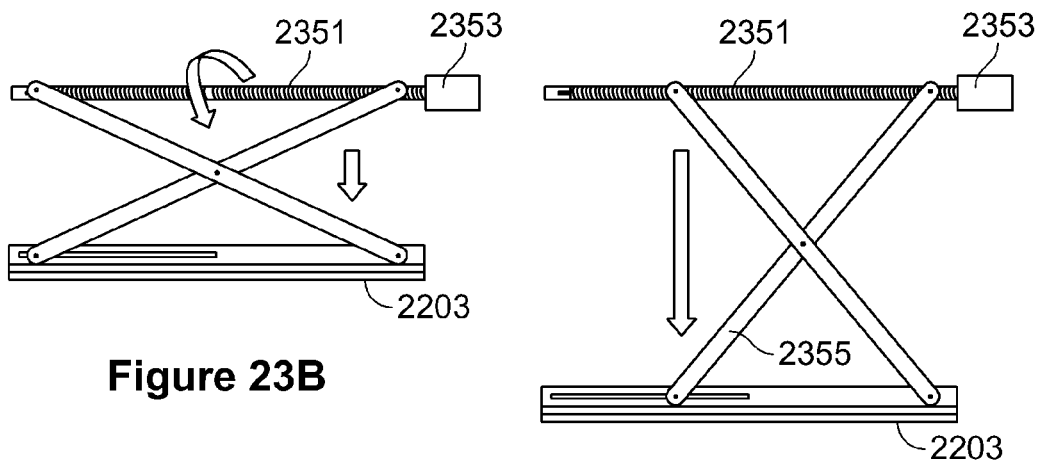
Figure 23B
Figure 23C

WIRELESS ENERGY TRANSFER VIA COUPLED PARASITIC RESONATORS

CROSS REFERENCE TO RELATED APPLICATIONS

This application claims benefit under 35 U.S.C. §119(e) to U.S. Provisional Patent Application No. 61/408,508 entitled "WIRELESS ENERGY TRANSFER VIA COUPLED PARASITIC RESONATORS" filed on Oct. 29, 2010, the disclosure of which is hereby incorporated by reference in its entirety.

FIELD

The present invention relates generally to wireless power transfer, and more specifically to devices, systems, and methods related to wireless power transfer to remote systems such as vehicles including batteries using parasitic resonators.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power receiver apparatus for powering or charging an electric vehicle. The wireless power receiver apparatus includes a receive circuit including a first coil. The receive circuit is configured to wirelessly receive power so as to power or charge the electric vehicle. The wireless power receiver apparatus further includes a passive circuit including a second coil. The passive circuit is configured to wirelessly receive power from a transmit circuit including a third coil. The passive circuit is further configured to wirelessly retransmit power received from the transmit circuit to the receive circuit. The wireless power receiver apparatus further includes a controller configured to displace the second coil from the first coil.

Another aspect of the disclosure provides an implementation of a method for wirelessly transferring power between a transmit circuit and an electric vehicle. The method includes wirelessly receiving power at a receive circuit including a first coil. The method further includes wirelessly receiving power at a passive circuit including a second coil from the transmit circuit. The method further includes wirelessly retransmitting power received from the transmit circuit to the receive circuit via the passive circuit. The method further includes providing the wirelessly transmitted power from the receive circuit to an energy storage device of the electric vehicle. The method further includes displacing the second coil from the first coil.

Yet another aspect of the disclosure provides a wireless power receiver apparatus for powering or charging an electric vehicle. The wireless power receiver apparatus includes means for wirelessly receiving power configured to wirelessly receive power so as to power or charge the electric vehicle. The wireless power receiver apparatus further includes means for passively wirelessly relaying power configured to wirelessly receive power from a means for wirelessly transmitting power. The means for passively wirelessly relaying power is further configured to wirelessly retransmit power received from the means for wirelessly transmitting power to the means for wirelessly receiving power. The wireless power receiver apparatus further includes means for controlling configured to displace the means for passively wirelessly relaying power from the means for wirelessly receiving power.

Another aspect of the disclosure provides a wireless power transmitter apparatus for powering or charging an electric vehicle. The wireless power transmitter apparatus includes a transmit circuit including a first coil. The transmit circuit is configured to wirelessly transmit power. The wireless power transmitter apparatus further includes a passive circuit including a second coil. The passive circuit is configured to wirelessly receive power from the transmit circuit. The passive circuit is further configured to wirelessly retransmit power received from the transmit circuit to a receive circuit. The receive circuit includes a third coil and is configured to provide power so as to power or charge the electric vehicle. The wireless power transmitter apparatus further includes a controller configured to displace the second coil from the first coil.

Another aspect of the disclosure provides an implementation of a method for wirelessly transferring power between a transmit circuit and an electric vehicle. The method includes wirelessly transmitting power from a transmit circuit including a first coil. The method further includes wirelessly receiving power at a passive circuit including a second coil from the transmit circuit. The method further includes wirelessly retransmitting the wirelessly received power to a receive circuit including a third coil via the passive circuit so as to provide power to power or charge the electric vehicle. The method further includes displacing the second coil from the first coil.

Another aspect of the disclosure provides a wireless power transmitter apparatus for powering or charging an electric vehicle. The wireless power transmitter apparatus includes means for wirelessly transmitting power. The wireless power transmitter apparatus further includes means for passively wirelessly relaying power configured to wirelessly receive power from the means for wirelessly transmitting power. The means for passively wirelessly relaying power is further configured to wirelessly retransmit power received from the means for wirelessly transmitting power to a means for wirelessly receiving power. The means for wirelessly receiving power is configured to provide power so as to power or charge the electric vehicle. The wireless power transmitter apparatus further includes means for controlling configured to displace the means for passively wirelessly relaying power from the means for wirelessly transmitting power.

BRIEF DESCRIPTION OF THE DRAWINGS

FIGS. 23A, 23B, and 23C illustrate mechanical devices which may be utilized to reposition a passive circuit induction coil within a wireless power transfer system.

Figure 1:
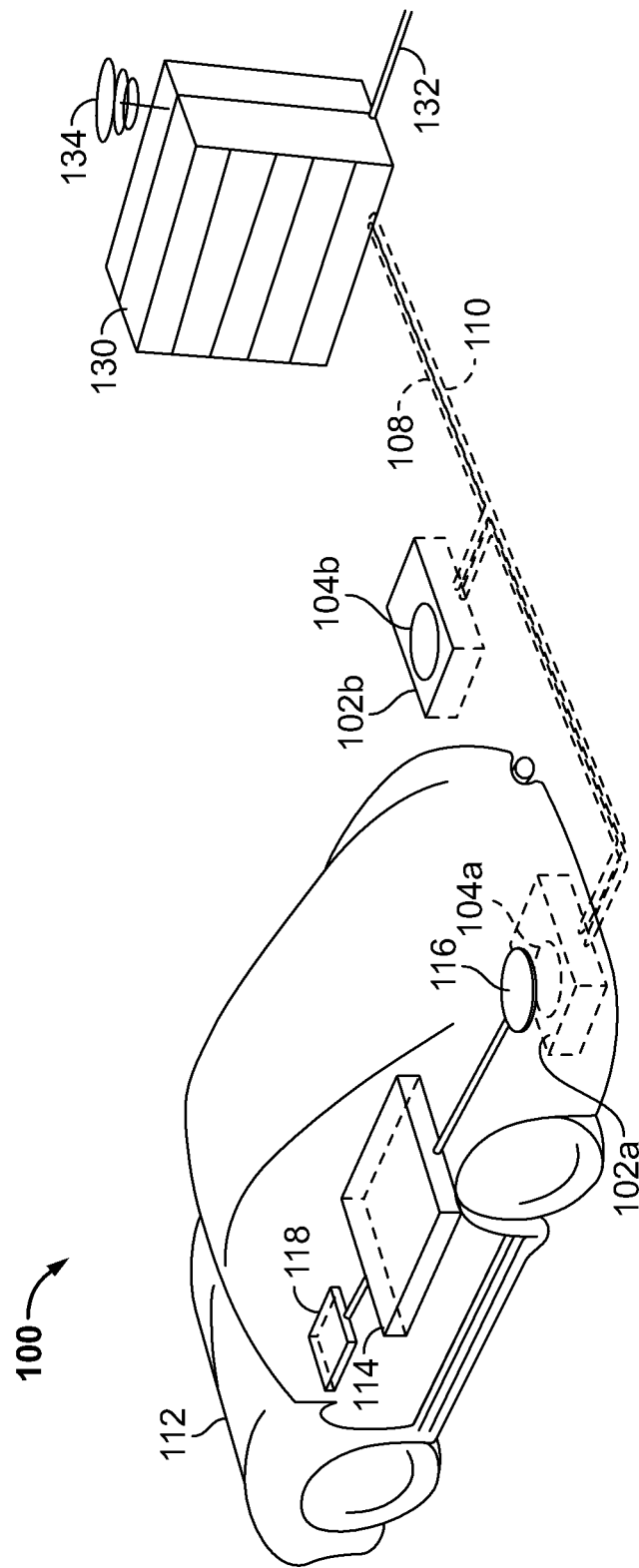
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space via a wireless field). The power output as a wireless field (e.g., a magnetic field) may be received or captured by a "receiving coil" to achieve power transfer. The amount of power transferred may be sufficient enough to power or charge a device. The wirelessly received power may be provided to one or more electrochemical cells or systems including electrochemical cells for the purpose of recharging the electrochemical cells.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, beside electric motors, a combustion engine for direct locomotion or charge the vehicle's battery (range extender). Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking areas to be parked over corresponding base wireless charging system 102a, 102b. In some embodiments, a local distribution center 130 may be connected to a power backbone 132 and configured to provide an alternating current (AC) or a direct current (DC) supply through a power link (or power supply) 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

Either the base system induction coil 104a or the electric vehicle induction coil 116 may also be referred to or be configured as a "loop" antenna. The base system induction coil 104a or the electric vehicle induction coil 116 may also be referred to herein or configured as a "magnetic" antenna or an induction coil. The term "coil" is intended in one aspect to refer to a component that may wirelessly output or receive energy for coupling to another "coil." The coil may also be referred to as an "antenna" of a type that is configured to wirelessly output or receive power.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about one $1/2\pi$ wavelength of the base system induction coil 104a (and vice versa for the electric vehicle induction coil 116) as will be further described below.

Local distribution center 130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since electric vehicles may be used as distributed storage devices to stabilize a power grid, a convenient docking-to-grid solutions may be desirable to increase availability of vehicles for vehicle-to-grid (V2G) operations.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a (e.g., in times of an energy shortage). This capability may be useful to stabilize the power distribution grid by allowing electric vehicles to contribute power to the overall distribution system in times of energy shortages caused by over-demand or a shortfall in renewable energy production (e.g., wind or solar).

Figure 2:
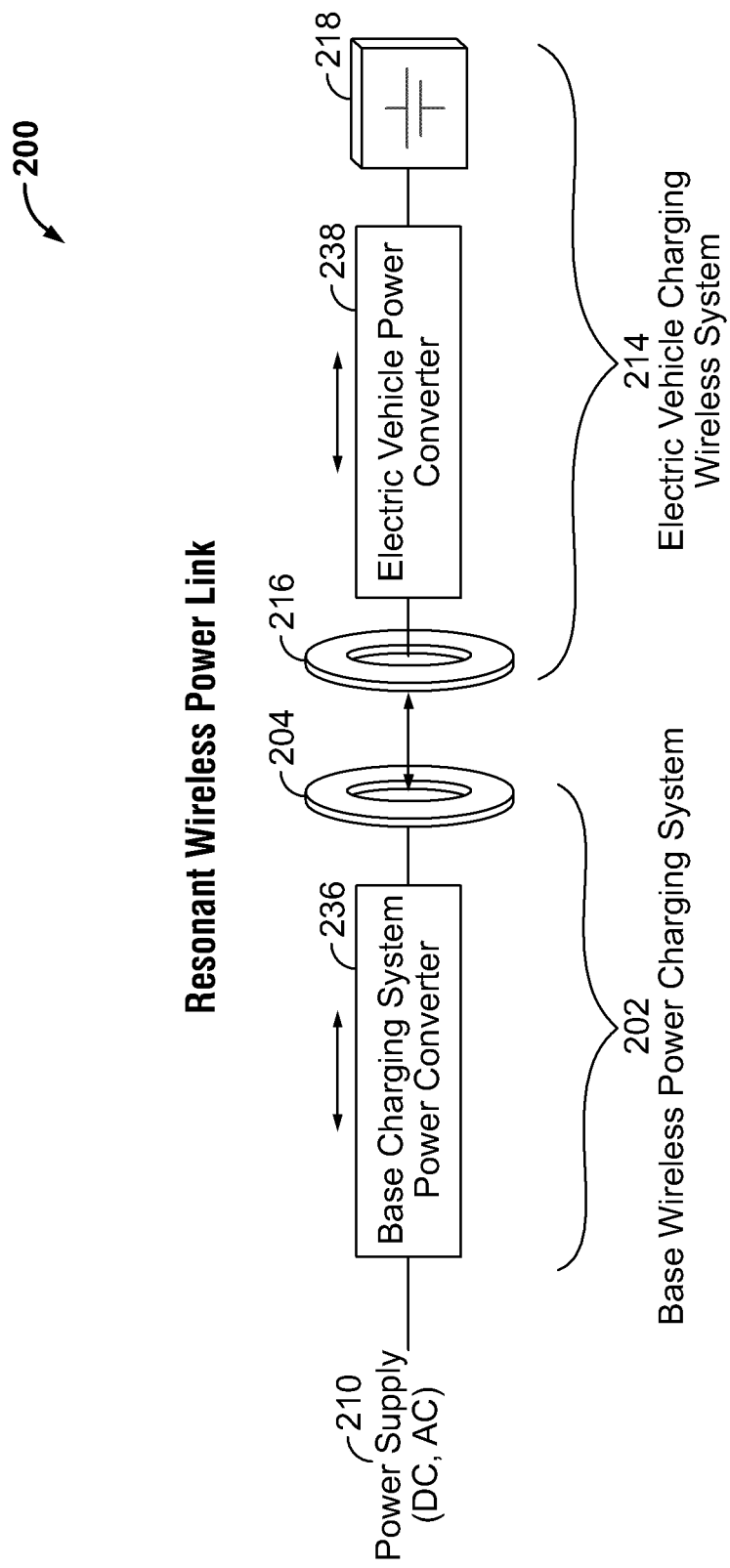
FIG. 2 is a functional block diagram of exemplary core components of the wireless power transfer system of FIG. 1.

FIG. 2 is functional block diagram of exemplary components of the wireless power transfer system of FIG. 1. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless charging system 202 to an electric vehicle 112, but is not limited thereto. For example, as discussed above, the electric vehicle 112 may transfer power to the base wireless charging system 102a.

With reference to FIG. 2, a power supply 210 (e.g., AC or DC) supplies power to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 drives the base system induction coil 204 to emit an electromagnetic field at a desired frequency.

The base system induction coil 204 and electric vehicle induction coil 216 may be tuned to substantially the same frequencies and may be positioned within the near-field of an electromagnetic field transmitted by one of the base system induction coil 204 and the electric vehicle induction coil 216. In this case, the base system induction coil 204 and electric vehicle induction coil 216 may become coupled to one another such that power may be transferred to the electric vehicle induction coil 216 and extracted in an electric vehicle power converter 238 of an electric vehicle wireless charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power to charge the electric vehicle battery unit 218. The power supply 210, base charging system power converter 236, and base system induction coil 204 may be stationary and located at a variety of locations as discussed above. The electric vehicle battery unit 218, electric vehicle power converter 238, and electric vehicle induction coil 216 may be included in an electric vehicle wireless charging system 214 that is part of electric vehicle 112 or part of the battery pack (not shown). The electric vehicle wireless charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive coils based on the mode of operation.

While not shown, the wireless power transfer system 200 may include a load disconnect unit (LDU) to safely disconnect the electric vehicle battery unit 218 or the power supply 210 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of a battery management system (not shown).

Further, the electric vehicle wireless charging system 214 may include switching circuitry for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle wireless charging system 114 (acting as the receiver) from the base wireless power charging system 102a. The load changes may be detected if the transmitter includes the load sensing circuit. Accordingly, the transmitter, such as a base wireless charging system 202, may have a mechanism for determining when receivers, such as an electric vehicle wireless charging system 114, are present in the near-field of the base system induction coil 204.

In operation, assuming energy transfer towards the vehicle or battery, input power is provided from the power supply 210 such that the base system induction coil 204 generates a field for providing the energy transfer. The electric vehicle induction coil 216 couples to the radiated field and generates output power for storage or consumption by the electric vehicle 112. In some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle wireless charging system 214 are minimal when the electric vehicle induction coil 216 is located in the near-field of the base system induction coil 204.

As stated, an efficient energy transfer occurs by coupling a large portion of the energy in the near field of a base system induction coil 204 to an electric vehicle induction coil 216 rather than propagating most of the energy in an electromagnetic wave to the far-field. When in the near field, a coupling mode may be established between the base system induction coil 204 and the electric vehicle induction coil 216. The area around the coils where this near field coupling may occur may be referred to herein as a coupling mode region.

While not shown, the base charging system power converter 236 and the electric vehicle power converter 238 may both include an oscillator, a power amplifier, a filter, and a matching circuit for efficient coupling with the wireless power coil. The oscillator may be configured to generate a desired frequency, which may be adjusted in response to an adjustment signal. The oscillator signal may be amplified by the power amplifier with an amplification amount responsive to control signals. The filter and matching circuit may be included to filter out harmonics or other unwanted frequencies and match the impedance of the power conversion module to the wireless power coil. The power converters 236 and 238 may also include a rectifier and switching circuitry to generate a suitable power output to charge the battery.

As described above, the electric vehicle induction coil 216 and base system induction coil 204 as described throughout the disclosed embodiments may be configured as "loop" antennas, and more specifically, multi-turn loop antennas, which may also be referred to herein as "magnetic" antennas. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting coil to the receiving coil residing within a region (e.g., within a predetermined frequency range of the resonant frequency, or within a predetermined distance of the near-field region) where this near field is established rather than propagating the energy from the transmitting coil into free space.

The resonant frequency of the coils is based on the inductance and capacitance of an transmit or receive circuit including an induction coil (e.g., the base system induction coil 204). Inductance in an induction coil is generally the inductance created by the loop, whereas, capacitance is generally added to the induction coil's inductance to create a resonant structure at a desired resonant frequency. As a non-limiting example, the self capacitance of the induction coil may solely be used or used in addition to create a resonant structure. In yet another non-limiting example, a capacitor may be added in series with the induction coil to create a resonant circuit that generates an electromagnetic field. Accordingly, for larger diameter induction coils, the value of capacitance needed to induce resonance may decrease as the diameter or inductance of the loop increases. Inductance may also depend on a number of turns of an induction coil. Furthermore, as the diameter of the induction coil increases, the efficient energy transfer area of the near field may increase. Other resonant circuits are possible. As another non-limiting example, a capacitor may be placed in parallel between the two terminals of the induction coil (e.g., a parallel resonant circuit). Furthermore a loop antenna may be designed to have a high quality (Q) factor to improve the resonance of the induction coil.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, e.g., within a small fraction of the wavelength. According to some embodiments, electromagnetic induction coils, such as single and multi-turn loop induction coils, are used for both transmitting and receiving since magnetic near field amplitudes in practical embodiments tend to be higher for magnetic type induction coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
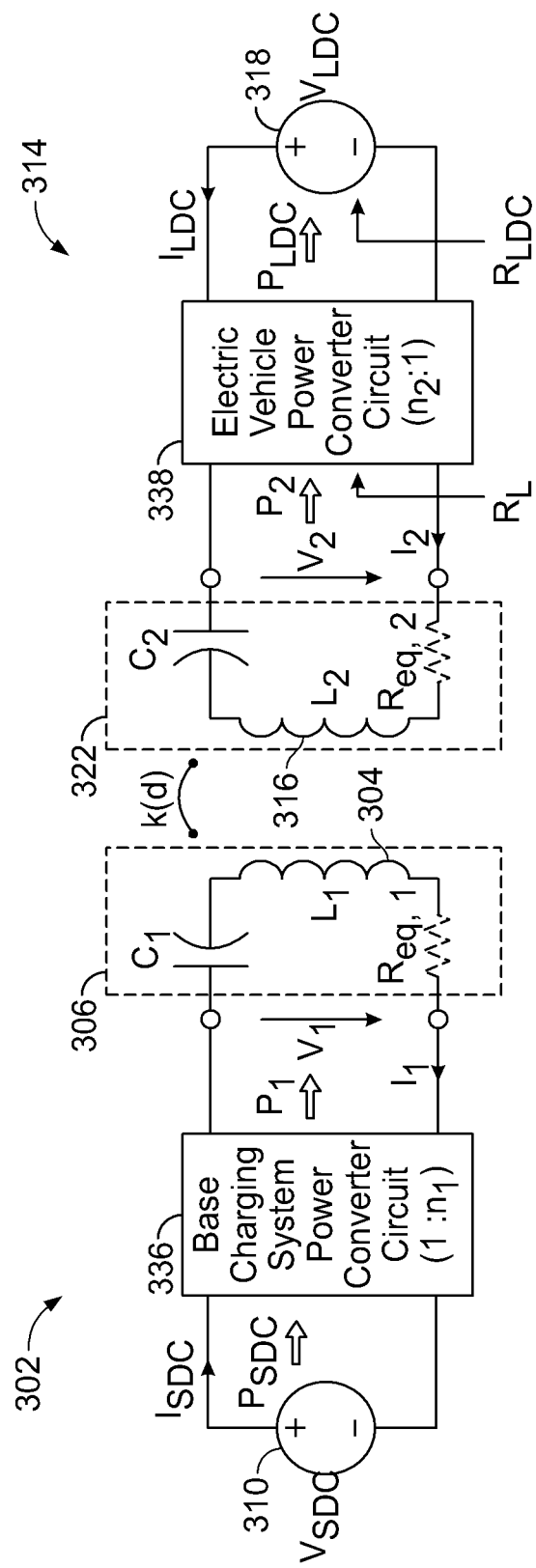
FIG. 3 is a schematic diagram of exemplary components of the wireless power transfer system of FIG. 2.

FIG. 3 is a schematic diagram of exemplary components of the wireless power transfer system of FIG. 2. As shown in FIG. 2, the wireless power transfer system 300 includes a base system transmit circuit 306 including a base system induction coil 304 having an inductance $L_1$. The wireless power transfer system 300 further includes an electric vehicle receive circuit 322 including an electric vehicle induction coil 316 having an inductance $L_2$. Element k(d) represents the mutual coupling coefficient resulting at coil separation. $C_1$ and $C_2$ are the capacitance of the base system transmit circuit 306 and the electric vehicle transmit circuit 322 which may include a capacitor used to form a resonant circuit that resonates at a desired frequency. Equivalent resistances $R_{eq,1}$ and $R_{eq,2}$ represent the losses that may be inherent to the induction coil coils and the anti-reactance capacitors. A power supply 310 supplies power $P_{SDC}$ to the base charging system power converter circuit 336, which in turn supplies power $P_1$ to capacitor $C_1$ in series with the base system induction coil 304. The electric vehicle receive circuit 322 including the electric vehicle induction coil 316 and capacitor $C_2$ in series receives power $P_2$ and provides the power $P_2$ to an electric vehicle power converter circuit 338. The electric vehicle power converter circuit 338 in turn may supply power $P_{LDC}$ to the electric vehicle battery 318.

For the purposes of some calculations described herein, both the power supply 310 and the electric vehicle battery unit 318 may be assumed constant voltage with voltages $V_{SDC}$ and $V_{LDC}$, respectively. This may reflect the characteristics of the power grid and the electric vehicle battery, respectively. In one aspect, constant voltage may be understood as a virtually zero source resistance and zero sink resistance.

Energy may be transferred from a base system transmit circuit 306 to an electric vehicle electric vehicle receive circuit 322. However, energy transfer may additionally occur in the reverse direction, for example, for purposes of vehicle-to-grid energy transfer. Power conversion may support reverse power flow (bidirectional, two quadrant control).

Figure 4:
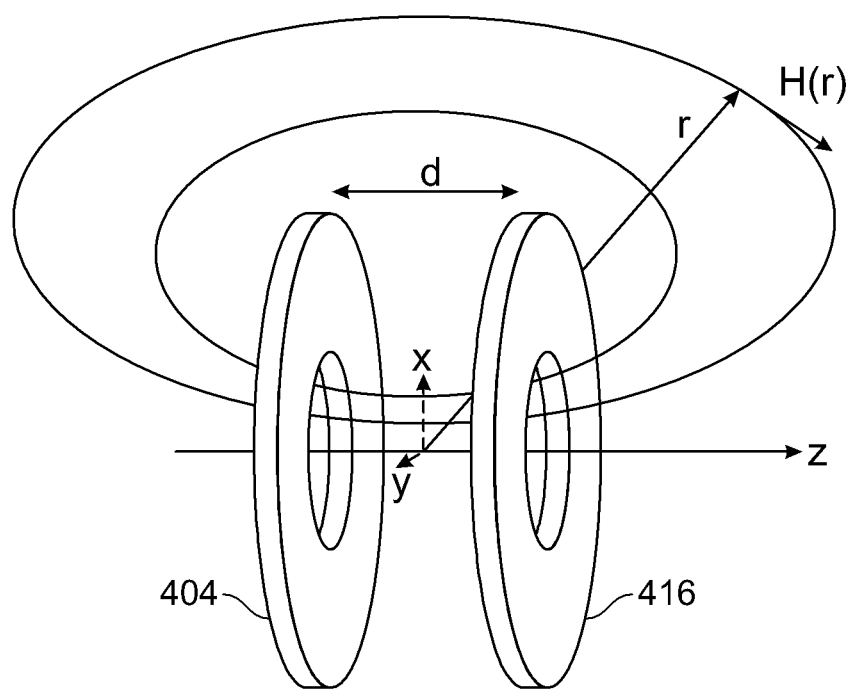
FIG. 4 is a diagram of a base system induction coil and electric vehicle induction coil showing magnetic field strength relative to a distance from the coils.

FIG. 4 is a diagram of a base system induction coil 404 and electric vehicle induction coil 416 showing magnetic field strength relative to a distance from the induction coils 404 and 416. A base system induction coil 404 and an electric vehicle induction coil 416 are separated by distance d respectively. FIG. 4 indicates the magnetic field vector H(r), at a position r in the vicinity of the wireless power transfer system, generated by the pair of coils.

In the exemplary embodiment in FIG. 3, the base charging system power converter circuit 336 may convert DC power into AC power at a desired frequency (operating frequency), in a low frequency (VLF) or LF range. For example, the range may be from 20 kHz to 60 kHz for a high power application. Any frequency within this range may be referred to herein as "LF."

In another embodiment, the base charging system power converter circuit 336 may also convert AC power at a standard "mains" frequency into AC power at an operating frequency suitable for wireless power. In yet another exemplary embodiment, the base charging system power converter circuit 336 may convert unfiltered DC (e.g., AC-pulsed DC power) into AC power at an operating frequency. In the two latter embodiments, power generated at operating frequency may be non-constant envelope.

A transformation ratio $1:n_1$ can also be attributed to the base charging system power converter circuit 336 in FIG. 3 and may be defined as:

$$1:n_1 = V_{SDC}:V_1; \quad \text{Equation 1}$$

where $V_{SDC}$ and $V_1$ denote the DC input voltage and the root mean square (r.m.s.) voltage of the fundamental frequency at LF output, respectively.

The electric vehicle power converter circuit 338 may perform reverse operation, reconverting LF power received by electric vehicle induction coil 316 back to DC power. Correspondingly, a transformation ratio $n_2:1$ is attributed to the electric vehicle power converter circuit 338, which may be defined as $$n_2:1 = V_2:V_{LDC}; \quad \text{Equation 2}$$

where $V_2$ and $V_{LDC}$ denote the r.m.s. voltage of the fundamental frequency at LF input and the DC output voltage, respectively.

Efficiency and power of an inductively coupled resonant link may reach a maximum if the resonance of both the base system induction coil 304 and an electric vehicle induction coil 316 are adjusted to the operating frequency. This may be valid for any coupling coefficient $0 < k(d) < 1$. Power conversion may require the system to be operated slightly off resonance if zero current switching is targeted. This may be explained by phase offset of harmonics components contained in the induction coil current.

For given parameters $L_1$, $L_2$, $n_1$, and $n_2$, there may exist an optimum load resistance $R_{LDC,opt}$ that may minimize losses in power conversion and in the resonant inductive link and thus may maximize end-to-end efficiency. End-to-end efficiency may be defined as $$\eta_{e2e} = \frac{P_{LDC}}{P_{SDC}} \quad \text{Equation 3}$$

where $P_{LDC} = V_{LDC} \cdot I_{LDC}$ and $P_{SDC} = V_{SDC} \cdot I_{SDC}$ denote the electric vehicle power converter circuit 338 output power and the base charging system power converter circuit 336 input power. Conversely, given load resistance and transformation ratios $n_j$ and $n_2$, there may exist an optimum pair of inductance $L_{1,opt}$ and $L_{2,opt}$ or alternatively, given $L_1$ and $L_2$, an optimum pair of ratio $n_{1,opt}$ and $n_{2,opt}$ maximizing efficiency $\eta_{e2e}$.

In one exemplary embodiment, it may be assumed that the wireless power transfer system 300 is fully symmetric, meaning that $$V_{DC} = V_{SDC} = V_{LDC}; \quad \text{Equation 4}$$

$$n = n_1 = n_2; \quad \text{Equation 5}$$

$$L = L_1 = L_2; \quad \text{Equation 6}$$

$$R_{eq} = R_{eq,1} = R_{eq,2}. \quad \text{Equation 7}$$

The description below applied to the case where the above conditions applied may further be applied to the general case of an asymmetric system.

Furthermore, for the purposes of description, it may be assumed that both base charging system power converter circuit 336 and electric vehicle power converter circuit 338 are lossless and any power conversion losses are accounted for in the equivalent loss resistances $R_{eq,1}$ and $R_{eq,2}$, respectively. The efficiency of the resonant inductive link that may be defined as the ratio of output power-to-input power:

$$\eta = \frac{P_2}{P_1} \quad \text{Equation 8}$$

that may be equal to the end-to-end efficiency $\eta_{e2e}$ as defined above.

Assuming switched-mode power conversion with a 50% duty cycle, voltage $V_1$ and $V_2$ may both be square waves. Though filtered by the effect of resonance, induction coil currents $I_1$ and $I_2$ may generally be non-sinusoidal with harmonic content depending on coupling coefficient. Thus, some power is transmitted via harmonics. In most cases however, energy transfer via harmonics is negligible. For the purpose of illustration, currents may be assumed substantially sinusoidal such that base system induction coil 304 input power and electric vehicle induction coil 316 output power can be defined as $$p_1 \cong \frac{V_{1,0}}{I_{1,0}} \quad \text{Equation 9}$$

$$P_2 \cong \frac{V_{2,0}}{I_{2,0}} \quad \text{Equation 10}$$

respectively with voltages and currents referring to the r.m.s. of the component at LF.

The following two equations describe system dimensioning.

The first equation describes an optimum induction coil inductance $$L_{opt} \cong \frac{R_{L,0}}{\omega_0 k(d)} \quad \text{Equation 11}$$

for maximizing $\eta$, given coupling coefficient $k(d)$, and angular operating frequency $\omega_0$. The load resistance may be defined as $$R_{L,0} = \frac{V_{2,0}}{I_{2,0}} \quad \text{Equation 12}$$

as presented by the electric vehicle power converter circuit 338 at fundamental frequency.

Equation 11 may be valid in for a "strongly coupled regime" where $L_{opt}$ is practically independent of the actual loss resistance $R_{eq}$. Equation 11 may further depend on the load resistance and the coupling coefficient, which generally may need to be adapted if load resistance and/or separation of base system induction coil 304 and electric vehicle induction coil 316 are changed.

Another equation may relates energy transfer rate $P_2$ and coupling coefficient $k(d)$ to the generated magnetic field $$H^2(r) \cong \frac{c(g_1, g_2, r)}{\omega_0} \frac{P_2}{k(d)} \quad \text{Equation 13}$$

where c denotes a constant that takes into account the base system induction coil 304 and electric vehicle induction coil 316 geometry $g_1$ and $g_2$, respectively, and the position the magnetic field strength refers to, defined by the position vector r as illustrated in FIG. 4. For Equation 13, it may be assumed that position r is enough distant to induction coils so that a change of their separation in the range of interest excerpts little influence on the magnetic field at reference position, except the effect of their mutual coupling.

A regulatory constraint may limit magnetic field strength $H(r_m)$ measured at a position $r_m$ in defined distance so as not to exceed a defined limit $H_{lim}$. This provides a limit for the energy transfer rate:

$$P_{2,max} \cong \frac{\omega_0}{c(g_1, g_2, r_m)} k(d) H_{lim}^2. \qquad \text{Equation 14}$$

As shown by Equation 14, a maximum energy transfer rate may decrease proportionally to the coupling coefficient. For example, assuming a maximum power of 4 kW at a coupling coefficient of 0.4, power may be limited to 2 kW if induction coil separation is increased so that a coupling coefficient of 0.2 results.

The voltage and current transformation ratio may be defined as applicable to the fundamental component:

$$n_0:1 = V_{2,0}:V_{LDC} = I_{DCL}:I_{2,0}. \qquad \text{Equation 15}$$

The corresponding load resistance may therefore be defined as:

$$R_{L,0} = \frac{n_0 V_{LDC}}{\left(\frac{1}{n_0}\right) I_{LDC}} = n_0^2 R_{LDC} = n_0^2 \frac{V_{LDC}^2}{P_{LDC}}, \qquad \text{Equation 16}$$

in terms of load voltage $V_{LDC}$ and load power $P_{LDC}$, and with an assumption of a lossless power conversion $P_2 = P_{LDC}$. Equation 11 may thus be written as:

$$L_{opt} \cong \frac{R_{L,0}}{\omega_0 k(d)} = \frac{n_0^2 R_{LDC}}{\omega_0 k(d)} = \frac{n_0^2 V_{LDC}^2}{\omega_0 k(d) P_2}. \qquad \text{Equation 17}$$

Substituting $P_2$ by Equation 14 in Equation 17 provides a relation between $L_{opt}$, $k(d)$, and $n_0$:

$$L_{opt} \cong \frac{c(g_1, g_2, r_m)}{\omega_0} \cdot \frac{n_0^2}{k^2(d)} \cdot \frac{V_{LDC}^2}{H_{lim}^2(r_m)}. \qquad \text{Equation 18}$$

To satisfy Equation 18 to ensure maximum efficiency and regulatory compliance, either induction coil inductance $L = L_1 = L_2$ or transformation ratio $n = n_1 = n_2$, or both may have to be adapted when distance is changed. Varying induction coil inductance may involve complex switching circuitry or mechanical gear, additional losses and non-optimum use of induction coil volume thus loss of quality factor. It also may require variable capacitance to maintain resonance.

A less complex and more economical solution may be provided by using power conversion to provide a required variable transformation ratio. Changing base charging system power converter circuit 336 transformation ratio $n_1$ may be equivalent to power control since it may largely affect energy transfer rate across the link. Changing electric vehicle power converter circuit 338 transformation ratio $n_2$ accordingly may help the wireless power link operate efficiently. This may be referred to as load adaptation.

Several methods for power control and load adaptation may include allowing for continuous change of transformation ratio, however sacrificing zero current switching (ZCS). This may lead to some increased switching loss and stress of switching devices. Another approach may maintain the ZCS condition, but permit change of transformation ratio only in coarse steps.

One method to change transformation ratio and that may provide low-losses is to change an operational mode of a bridge (e.g., from full-bridge mode to half-bridge mode or vice versa).

Figure 5:
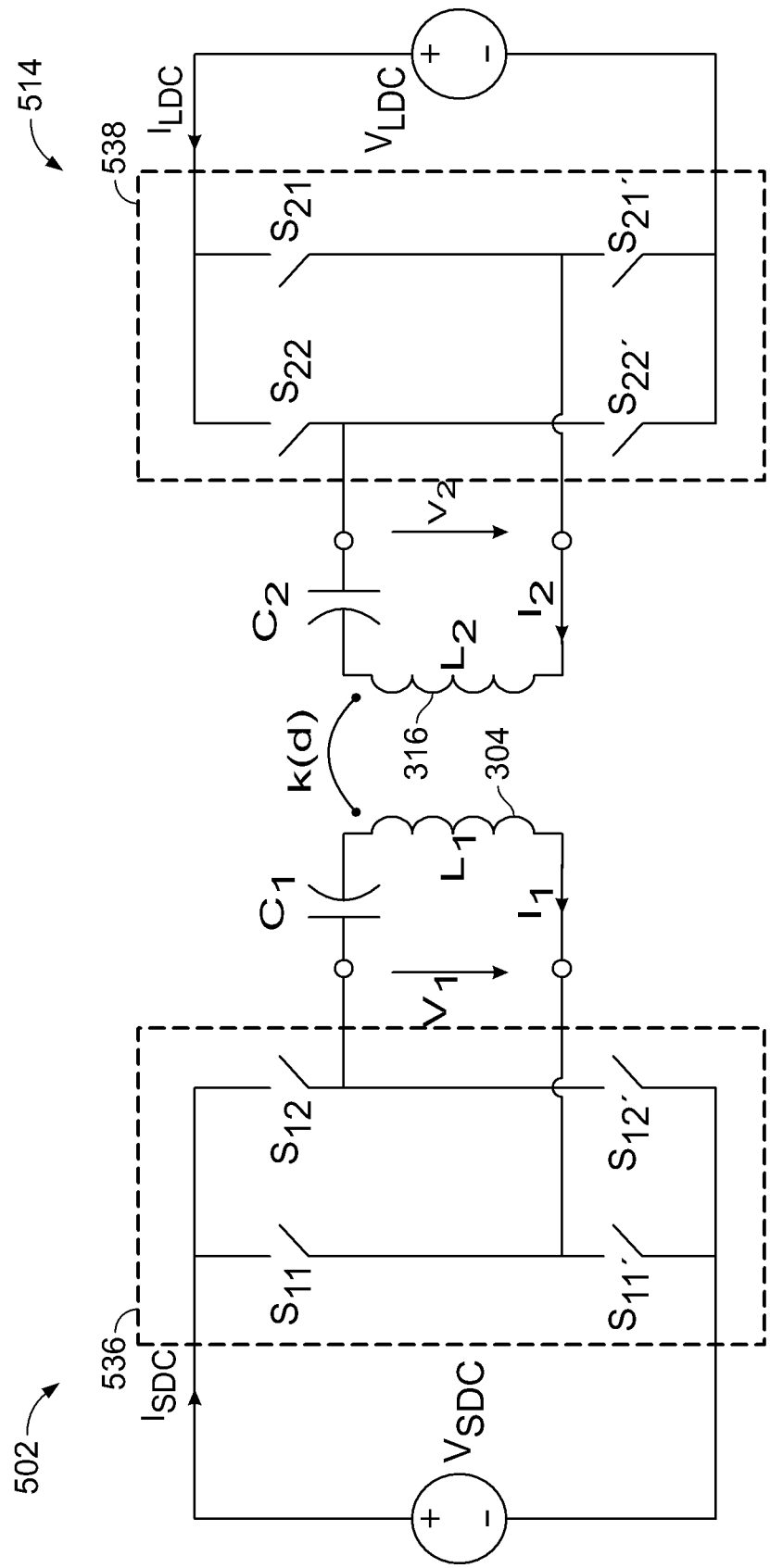
FIG. 5 is a schematic diagram of an exemplary wirelessly power transfer system as a full-bridge power conversion and a half-bridge.

FIG. 5 is a schematic diagram of an exemplary wirelessly power transfer system as a full-bridge power conversion and a half-bridge. The base charging system power converter circuit 536 switches $S_{1j}$ may represent FET or IGBT solid state devices. Switches of the electric vehicle power converter circuit 538 when configured to perform LF-to-DC power conversion may be passive diodes but also active devices, in case of synchronous rectification.

In full or H-bridge mode, all switches of power conversion are toggling in a manner that $S_{j1}$ and $S_{j2'}$, $S_{j1}$ are closed at the same time. When $S_{j1}$ is closed then $S_{j2}$ and $S_{j1'}$ are open and vice versa. This may apply to base charging system power converter circuit 536 and electric vehicle power converter circuit 538 power conversion ($j \in \{1,2\}$).

In half-bridge mode, only $S_{11}$ and $S_{11'}$ are toggling $S_{12'}$ and $S_{12}$ are static. When $S_{11}$ is closed then $S_{11'}$ is open and vice versa. In the static half-bridge $S_{12'}$ may be closed. The fact that current may need to pass switch $S_{12'}$ may cause some extra losses, which may not exist in a non-adaptive half-bridge-based system. The additional switch on-state resistance may provide an economical solution be a low price for a system that is capable efficient adaptation to two different transfer distances.

In case of a unidirectional energy transfer system using a passive diode full-bridge rectifier in electric vehicle power converter circuit 538 power conversion, one half-bridge may be supplemented with active switches (FETs or IGBTs) in parallel to the diodes. These transistors could be static switches.

A full-bridge may transform a DC voltage level into a LF voltage level of the fundamental by $$n_0 = \frac{\sqrt{8}}{\pi} \qquad \text{Equation 19}$$

which is approximately 1.

Correspondingly, a half-bridge may transform by $$n_0 = \frac{\sqrt{2}}{\pi} \qquad \text{Equation 20}$$

which is approximately ½.

A system that may be capable of adjusting the electric vehicle induction coil 516 to two discrete z-positions corresponding to a shorter distances d' and a longer distance d", respectively, may also be provided. If conditions permit, the system may use the shorter distance, e.g. that corresponds to a coupling coefficient k(d'), else it adjusts to d" corresponding to k(d"). Distances are chosen such that $$k(d') = 2 \cdot k(d''). \qquad \text{Equation 21}$$

From Equation 18, Equation 19, Equation 20, and Equation 21, an inductance $L_{opt}$ can be found that is optimum at both distances, if the system operates in full-bridge mode at distance d' and in half-bridge mode at distance d". This is shown by defining $$c' = \frac{c(g_1, g_2, r_m)}{\omega_0} \cdot \frac{V_{LDC}^2}{H_{lim}^2(r_m)} \quad \text{Equation 22}$$

and by expressing the optimum induction coil inductance (Equation 18) as follows:

$$L_{opt} \cong c' \cdot \frac{8}{\pi^2 k^2(d')} \quad \text{Equation 23}$$

$$= c' \cdot \frac{2}{\pi^2 k^2(d'')}$$

$$= c' \cdot \frac{2}{\pi^2 k^2(d')/4}.$$

An example of a system that is capable to optimally adapt to two different distances by changing mode of power conversion while attempting to maintain maximum efficiency and maximum power within regulatory constraints is shown in the table below.

TABLE 1

Example of a system that optimally adapts to two different distances

| Distance $d$ | Coupling coefficient $k(d)$ | Operating mode | Transformation ratio $n0$ | Energy transfer rate $P_2$ [kW] |
|---|---|---|---|---|
| 4.8 cm | 0.4 | Full-bridge | $\frac{\sqrt{8}}{\pi}$ | 4 |
| 10 cm | 0.2 | Half-bridge | $\frac{\sqrt{2}}{\pi}$ | 2 |

The method of bridge reconfiguration may be combined with other methods of power control/load adaptation in order to adapt the link to any distance within a predefined range and/or to throttle load power (battery charge current). Examples of alternative methods include operating the link off-resonance by changing frequency, intentional detuning of the base system induction coil 504 or electric vehicle induction coil 516, using PWM drive waveforms with duty cycle <50%, using a DC-to-DC converter in the base charging system power converter circuit 536 and the electric vehicle power converter circuit 538 power conversion, phase switching in case of 2-phase or 3-phase supply, and the like. These methods may all be considered directly or indirectly changing transformation ratios $n_1$ and $n_2$.

Transformation ratio and induction coil z-axis position may be controlled by a control system (described above) with entities in the base wireless power charging system 502 and electric vehicle wireless charging system 514. These entities may communicate using in-band or out-of-band signaling.

Regarding the derivation of Equation 11, the optimum load resistance of a magnetically coupled resonant system may be shown by $$R_{L,opt} = R_2 \sqrt{1 + k^2 Q_1 Q_2} \quad \text{Equation 24}$$

where $R_2$ denotes the loss resistance of the resonant receive induction coil, $Q_1$ and $Q_2$ the Q-factors of a resonant transmit and receive induction coil, respectively, and k the coupling coefficient. Loading the magnetic link with $R_{1,opt}$ may maximize transfer efficiency.

For a strongly coupled regime:

$$k^2 Q_1 Q_2 \gg 1 \quad \text{Equation 25}$$

or in the so-called 'magic' regime where link efficiency is close to 100%, Equation 24 may be simplified to $$R_{L,opt} \cong R_2 \sqrt{k^2 Q_1 Q_2}. \quad \text{Equation 26}$$

If a fully symmetric link is assumed with $$L = L_1 = L_2 \quad \text{Equation 27}$$

$$R = R_1 = R_2 \quad \text{Equation 28}$$

and substituting Q-factors $Q_1$ and $Q_2$ in Equation 26 by $$Q = Q_1 = Q_2 = \frac{\omega_0 L}{R} \quad \text{Equation 29}$$

yields $$R = k\omega_0 L \quad \text{Equation 30}$$

Conversely, given the load resistance $R_L$, there may exist an optimum induction coil inductance $$L_{opt} \cong \frac{R_L}{k\omega_0} \quad \text{Equation 31}$$

that maximizes efficiency.

Regarding the derivation of Equation 13, the magnetic field strength as produced at a location r by the electric vehicle induction coil 516 that is in essence a multi-turn wire loop may be expressed as $$H_2(r) = N_2 \cdot I_{2,0} \gamma(g_2, r) \quad \text{Equation 32}$$

where $N_2$ denotes number of turns of the induction coil, $I_{2,0}$ the induction coil current at fundamental, and $\gamma$ is basically a function of its geometry $g_2$ and position vector r where the field strength refers to. Equation 32 assumes that varying the number of turns would not change the induction coil coils geometry, hence $g_2 \neq f(N_2)$.

The inductance of the multi-turn loop may be expressed as $$L_2 = N_2^2 \cdot \beta(g_2) \quad \text{Equation 33}$$

where $\beta$ is basically a function of coil geometry $g_2$.

The load resistance may be expressed as a function of power $P_2$ and current $I_{2,0}$ as follows:

$$R_{L,0} \cong \frac{P_2}{I_{2,0}^2}. \quad \text{Equation 34}$$

Using Equation 11 and substituting above equations yields $$N_2^2 \cdot \beta(g_2) \cong \frac{P_2}{\omega_0 k(d) \cdot I_{2,0}^2}. \quad \text{Equation 35}$$

For equation 35, the square of the magnetic field strength at position r may be defined as $$N_2^2 \cdot I_{2,0}^2 \cdot \beta(g_2) = H_2^2(r) \frac{\beta(g_2)}{\gamma^2(g_2, r)} \cong \frac{P_2}{\omega_0 k(d)}. \quad \text{Equation 36}$$

Defining $$c(g, r) = \frac{\gamma^2(g_2, r)}{\beta(g_2)} \quad \text{Equation 37}$$

yields $$H_2^2(r) \cong \frac{c(g_2, r)}{\omega_0} \frac{P_2}{k(d)}. \quad \text{Equation 38}$$

A base system induction coil 504 contribution to the magnetic field which is according to Equation 32

$$H_1(r) = N_1 \cdot I_{1,0} \cdot \gamma(g_1, r) \quad \text{Equation 39}$$

may be neglected.

In the symmetric case, number of turns $N_1$ equals $N_2$ and current $I_{1,0}$ of base system induction coil 504 will change proportionally to $I_{2,0}$. Hence contributions from base system induction coil and electric vehicle induction coil $H_1(r)$ and $H_2(r)$ at location r may also change proportionally, because $$\frac{P_2}{P_1} = \frac{V_{2,0} I_{2,0}}{V_{1,0} I_{1,0}} = \frac{I_{2,0}}{I_{1,0}} = \eta \quad \text{Equation 40}$$

given that $V_{SDC} = V_{LDC}$ hence $V_{1,0} = V_{2,0}$.

It may be shown that proportions would also remain in the asymmetric case ($N_1 \neq N_2$) if $N_2$ was changed in a process of optimization. Defining $c(g_1, g_2, r)$ that takes into account geometry of both induction coils as well as the phase offset of $I_{1,0}$ relative to $I_{2,0}$, which in case of resonance may be 90 degrees independent of the mutual coupling, the sum field may be expressed as $$H^2(r) \cong \frac{c(g_1, g_2, r)}{\omega_0} \frac{P_2}{k(d)}, \quad \text{Equation 41}$$

which is shown in Equation 13.

Figure 6A:
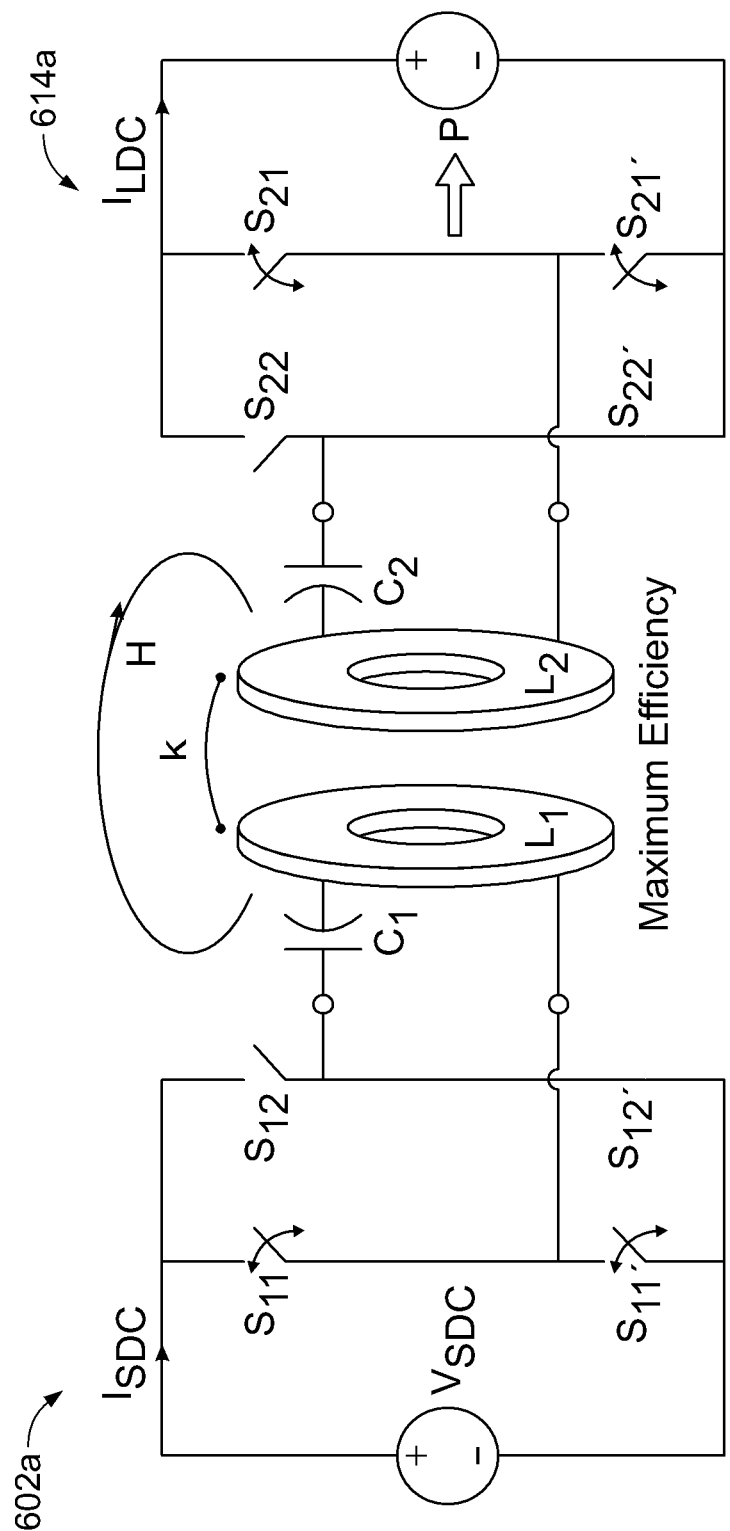
FIGS. 6A and 6B are schematic diagrams of an exemplary half-bridge power conversion configuration and an exemplary full-bridge power conversion configuration.
Figure 6B:
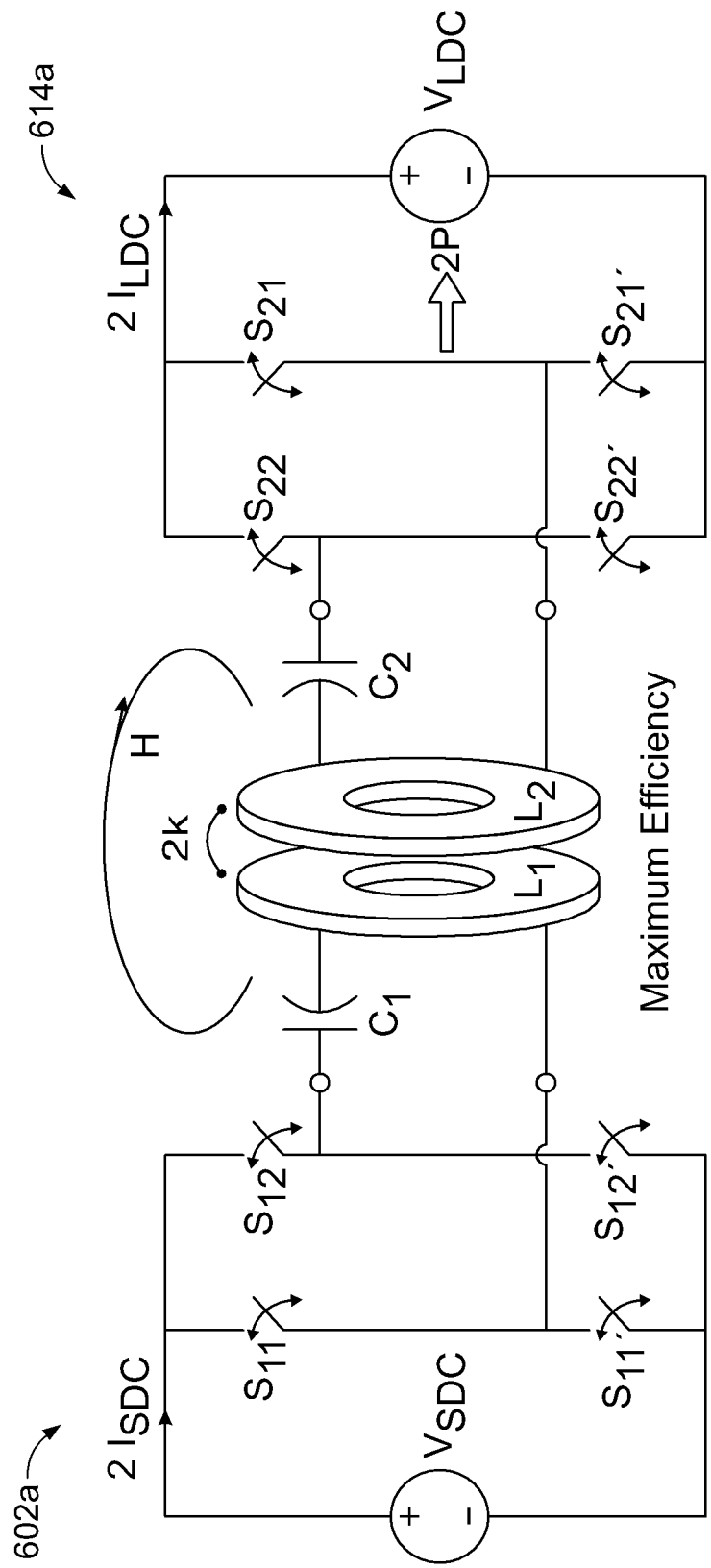

FIGS. 6A and 6B illustrate two exemplary circuit configurations of the wireless power transfer system of FIG. 5. In FIG. 6A, the configuration may assume (1) a longer distance or in general a looser coupling between transmit and receive induction coil and that (2) both transmit and receive side power conversion operate in half-bridge mode. In FIG. 6B, configuration B assumes (1) a shorter distance or in general a tighter coupling between transmit and receive induction coil, (2) both transmit and receive side power conversion operate in full-bridge mode.

Furthermore, for the purposes of illustration, both configurations may assume a constant voltage source and a constant voltage sink. This assumption may be reasonable considering a system that transfers energy from the power grid to a vehicles battery (G2V) or vice versa (V2G). Energy transfer rate may double with the configuration of FIG. 6B without the need for adapting the supply voltage and sink voltage and the reactance of resonant induction coils (inductances and capacitances) that are both implemented without additional circuitry and/or mechanics for power/voltage conversion and/or variable reactance. Both configurations may be optimally matched to achieve maximum energy transfer efficiency. Both configurations may be equivalent in terms of magnetic field strength as measured in the induction coil's vicinity, thus potential to fully exploiting a regulatory/EMC constraint.

A constant voltage sink (battery) may be used as opposed to a constant load resistance. An adaptive system and a method to transfer energy from a voltage source to a voltage sink either over a longer distance (looser coupling) with a lower power or over a shorter distance (tighter coupling) with a higher power may be used, where the system is adaptable to operate at maximum efficiency, also optimally exploiting a regulatory limit, solely by changing mode of operation of transmit and receive side power conversion to either half-bridge mode or full-bridge mode, respectively.

Figure 7:
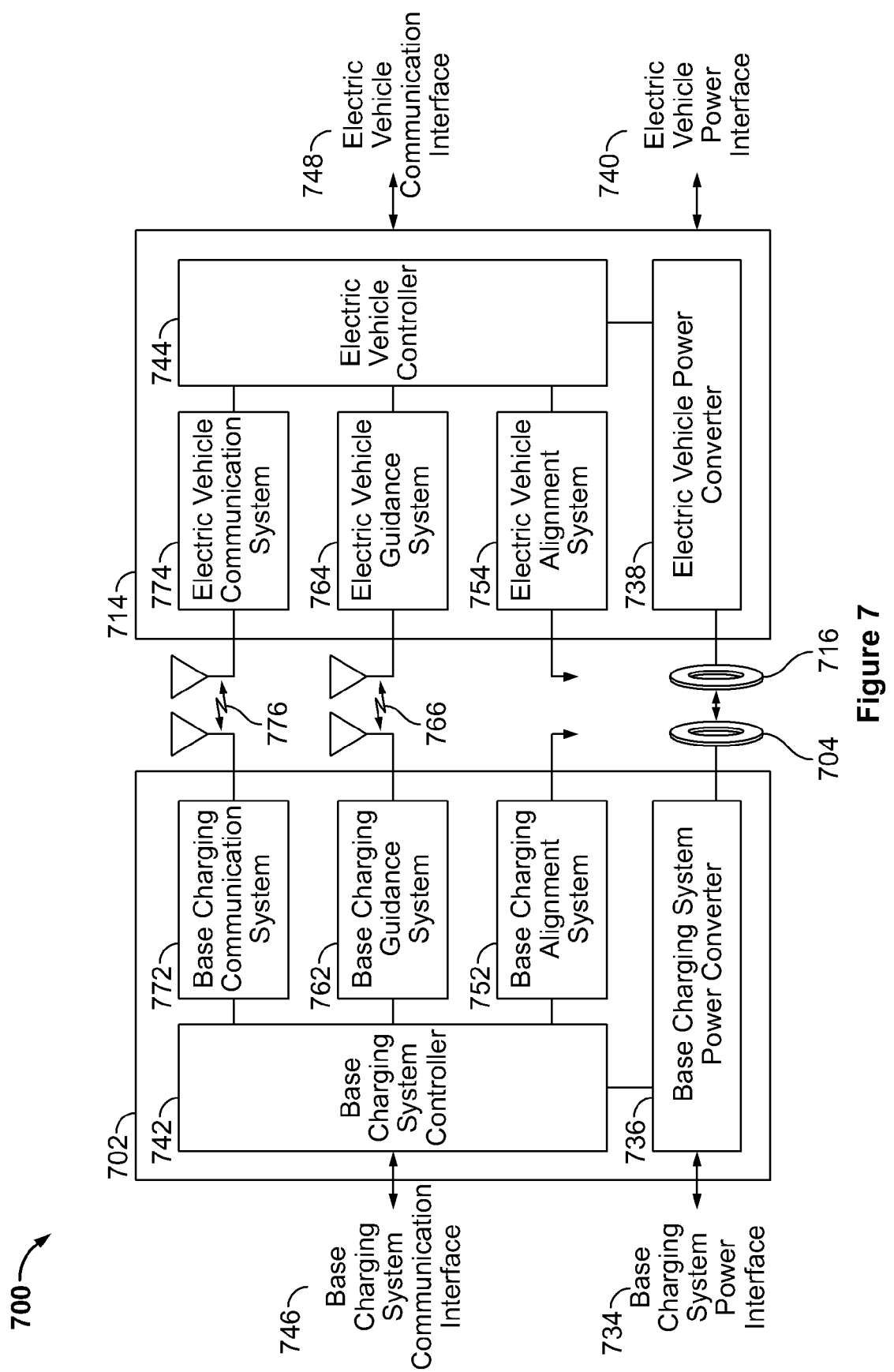
FIG. 7 is another functional block diagram showing exemplary core and ancillary components of the wireless power transfer system of FIG. 1.

FIG. 7 is another functional block diagram of exemplary components of the wireless power transfer system of FIG. 1. The wireless power transfer system 700 illustrates a communication link 776, a guidance link 766, and alignment systems 752, 754 for the base system induction coil 704 and electric vehicle induction coil 716. As described above with reference to FIG. 1, and assuming energy flow towards the electric vehicle 112, in FIG. 7 a base charging system power interface 734 may be configured to provide power to a base charging system power converter 736 from a power source, such as an AC or DC power supply 110. The base charging system power converter 736 may receive AC or DC power from the base charging system power interface 734 to excite the base system induction coil 704 at or near its resonant frequency. The electric vehicle induction coil 716, when in the near field coupling-mode region, may receive energy from the near field coupling mode region to oscillate at or near the resonant frequency. The electric vehicle power converter 738 converts the oscillating signal from the electric vehicle induction coil 716 to a power signal suitable for charging a battery via the electric vehicle power interface 740.

The base wireless charging system 702 includes a base charging system controller 742, and the electric vehicle wireless charging system 714 includes an electric vehicle controller 744. The base charging system controller 742 may include a base charging system communication interface 746 to other systems (not shown) such as, for example, a computer, and a power distribution center, or a smart power grid. The electric vehicle controller 744 may include an electric vehicle communication interface 748 to other systems (not shown) such as, for example, an on-board computer on the vehicle, other battery charging controller, other electronic systems within the vehicles, and remote electronic systems.

The base charging system controller 742 and electric vehicle controller 744 may include subsystems or modules for specific application with separate communication channels. These communications channels may be separate physical channels or separate logical channels. As non-limiting examples, a base charging alignment system 752 may communicate with an electric vehicle alignment system 754 through a communication link 776 to provide a feedback mechanism for more closely aligning the base system induction coil 704 and electric vehicle induction coil 716, either autonomously or with operator assistance. Similarly, a base charging guidance system 762 may communicate with an electric vehicle guidance system 764 through a guidance link 766 to provide a feedback mechanism to guide an operator in aligning the base system induction coil 704 and electric vehicle induction coil 716. In addition, there may be separate general-purpose communication links (e.g., channels) supported by base charging communication system 772 and electric vehicle communication system 774 for communicating other information between the base wireless charging system 702 and the electric vehicle wireless charging system 714. This information may include information about electric vehicle characteristics, battery characteristics, charging status, and power capabilities of both the base wireless charging system 702 and the electric vehicle wireless charging system 714, as well as maintenance and diagnostic data for the electric vehicle 112. These communication channels may be separate physical communication channels such as, for example, Bluetooth, zigbee, cellular, etc.

Electric vehicle controller 744 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle wireless charging system 114. Further, electric vehicle controller 744 may be configured to communicate with electronics of the electric vehicle 112. For example, electric vehicle controller 744 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 700 may include detection and sensor systems. For example, the wireless power transfer system 700 may include sensors for use with systems to properly guide the driver or the vehicle to the charging spot, sensors to mutually align the induction coils with the required separation/coupling, sensors to detect objects that may obstruct the electric vehicle induction coil 716 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 704 that may be heated up (induction heating), detection of hazardous events such as incandescent objects on the base system induction coil 704, and temperature monitoring of the base wireless charging system 702 and electric vehicle wireless charging system 714 components.

The wireless power transfer system 700 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 702 and an electric vehicle wireless charging system 714, the wireless power transfer system 700 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the base system induction coil 704 and electric vehicle induction coil 716 may also be configured to act as wireless communication antennas. Thus, some embodiments of the base wireless charging system 702 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 736 may include a load sensing circuit (not shown) for detecting the presence or absence of active electric vehicle receivers in the vicinity of the near field generated by the base system induction coil 704. By way of a non-limiting example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 742 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 8:
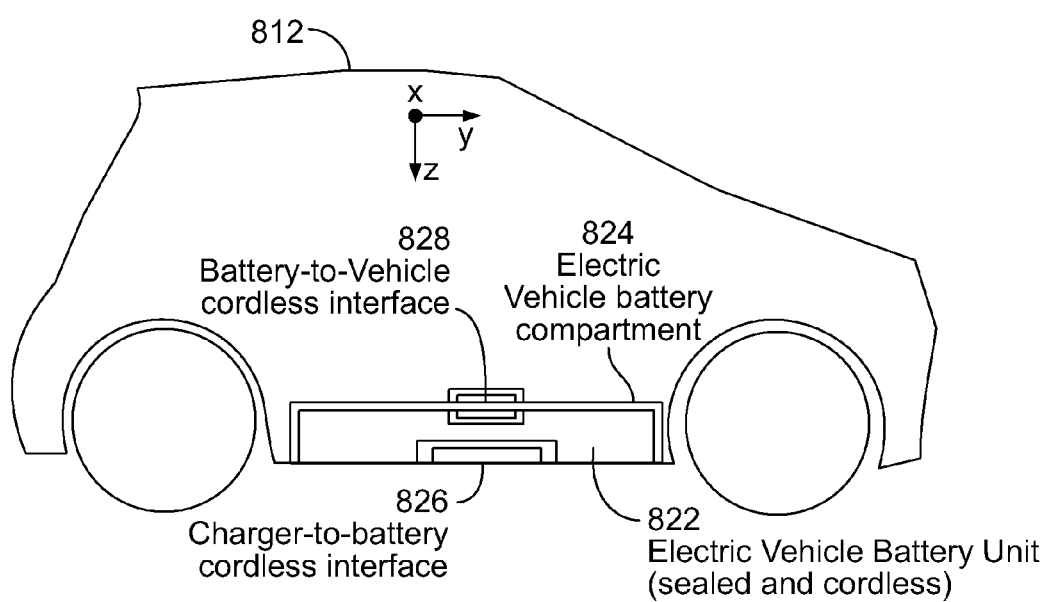
FIG. 8 is a functional block diagram showing a replaceable contactless battery disposed in an electric vehicle, in accordance with an exemplary embodiment of the invention.

The wireless power transfer system 300 may be used with a variety of electric vehicles including rechargeable or replaceable batteries. FIG. 8 is a functional block diagram showing a replaceable contactless electric vehicle battery unit 818 disposed in an electric vehicle 812, in accordance with an exemplary embodiment of the invention. In this embodiment, the low battery position may be useful for an electric vehicle battery unit 818 that integrates a wireless power interface (e.g., a charger-to-battery cordless interface 826) and that may receive power from a base wireless charging system (not shown) embedded in the ground. In FIG. 8, the electric vehicle battery unit 818 may be a rechargeable battery unit, and may be accommodated in an electric vehicle battery compartment 824. The electric vehicle battery unit 818 may also provide wireless power to a charger-to-battery cordless interface 826, which may integrate the entire electric vehicle wireless charging system including a resonant induction coil, power conversion circuitry, and other control and communications functions as needed for efficient and safe wireless energy transfer between a ground-based wireless charging unit and the electric vehicle battery unit.

It may be useful for the electric vehicle induction coil (not shown) to be integrated flush with a bottom side of electric vehicle battery unit or the vehicle body so that there are no protrusive parts and so that the specified ground-to-vehicle body clearance may be maintained. This configuration may require some room in the electric vehicle battery unit 818 dedicated to the electric vehicle wireless charging system. The electric vehicle battery unit 818 may also include a battery-to-vehicle cordless interface 828, and a charger-to-battery cordless interface 826 that provides contactless power and communication between the electric vehicle 812 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

Figure 9A:
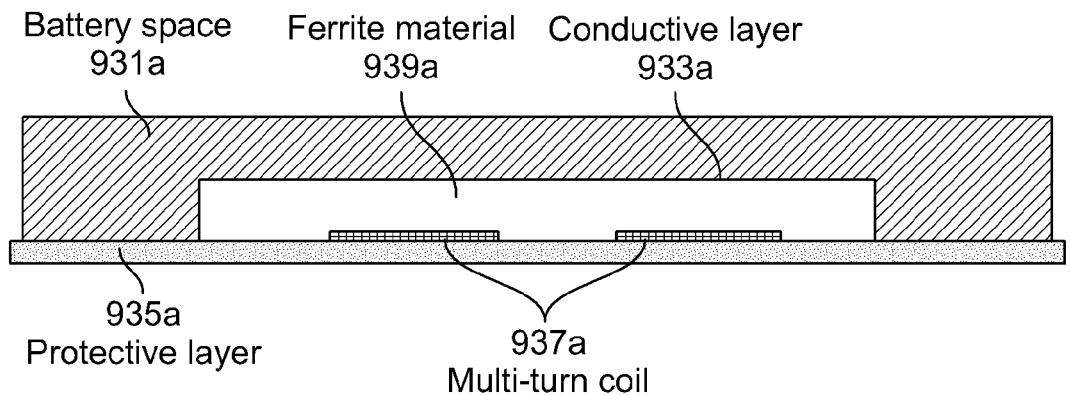
FIGS. 9A, 9B, 9C, and 9D are diagrams of exemplary configurations for the placement of a wireless power coil and ferrite material relative to a battery, in accordance with exemplary embodiments of the invention.

FIGS. 9A, 9B, 9C, and 9D are diagrams of exemplary configurations for the placement of a wireless power induction coil and ferrite material relative to a battery, in accordance with exemplary embodiments of the invention. FIG. 9A shows a fully ferrite embedded induction coil. The wireless power induction coil may include a ferrite material 939a and a multi-turn coil (or coil) 937a wound about the ferrite material 939a. The coil 937a itself may be made of stranded Litz wire. A conductive layer (or conductive shield) 933a between the battery space 931a and the vehicle may be provided to protect passengers of the vehicle from excessive EMF exposure. Conductive shield 933a may be particularly useful in vehicles made of plastic or composites. The coil 937a, ferrite material 939a, and battery space 931a may be covered on one side by a protective layer 935a of plastic.

Figure 9B:
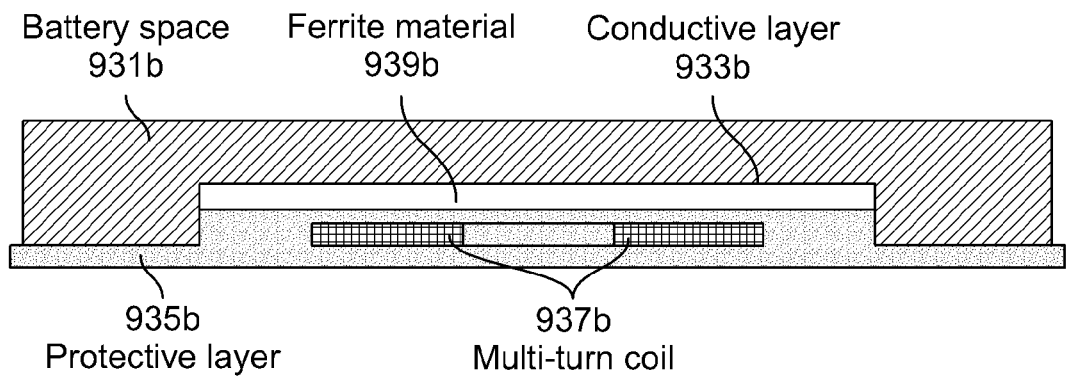

FIG. 9B shows an optimally dimensioned ferrite plate (i.e., ferrite backing) to enhance coupling and to reduce eddy currents (heat dissipation) in the conductive layer 933b between the battery space 931b and the vehicle. The multi-turn coil 937b may be fully embedded in a non-conducting, non-magnetic (e.g., plastic) protective layer 935b. For example, as illustrated in FIG. 9B, the coil 937b may be embedded in a protective layer 935b. There may be a separation between the coil 937b and the ferrite material 939b as the result of a trade-off between magnetic coupling and ferrite hysteresis losses.

Figure 9C:
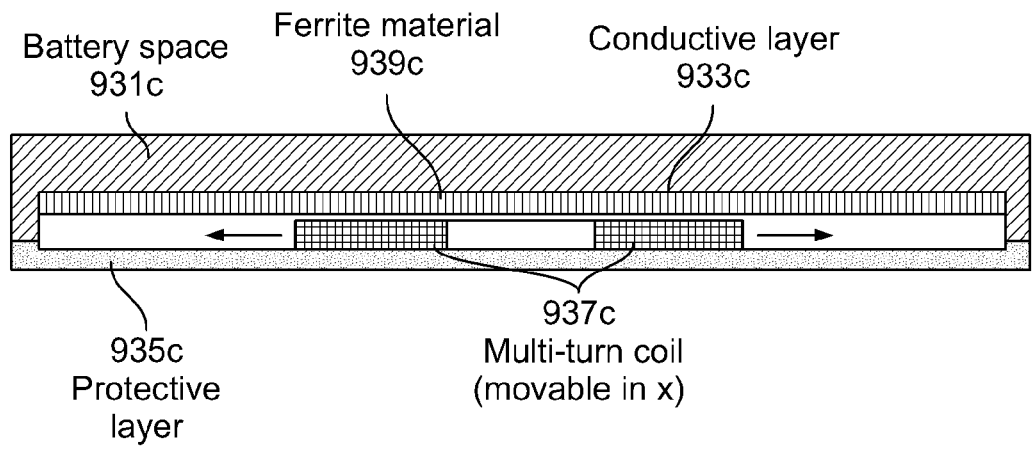
Figure 9D:
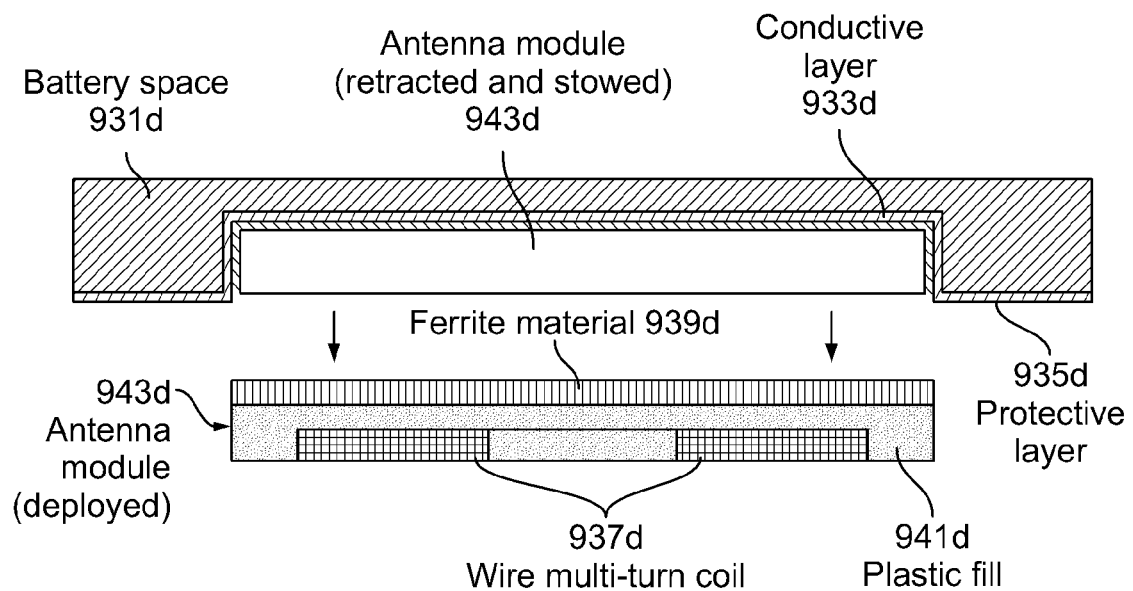

FIG. 9C illustrates another embodiment where the multi-turn coil 937c (e.g., a copper Litz wire multi-turn coil) may be movable in a lateral ("x") direction. FIG. 9D illustrates another embodiment where the electric vehicle induction coil module 943d is deployed in a downward direction. In some embodiments, the electric vehicle battery unit includes one of a deployable and non-deployable electric vehicle induction coil module 943d as part of the wireless power interface. To prevent magnetic fields from penetrating into the battery space 931d and into the interior of the vehicle, there may be a conductive layer 933d (e.g., a copper sheet) between the battery space 931d and the vehicle. Furthermore, a non-conductive (e.g., plastic) protective layer 935d may be used to protect the conductive layer (or conductive shield) 933d, the coil 937d, and the ferrite material 939d from environmental impacts (e.g., mechanical damage, oxidization, etc.). Furthermore, the multi-turn coil 937d may be movable in lateral X and/or Y directions. FIG. 9D illustrates an embodiment wherein the electric vehicle induction coil module 943d is deployed in a downward Z direction relative to an electric vehicle battery unit body.

The design of this deployable electric vehicle induction coil module 943d is similar to that of FIG. 9B except there is no conductive layer 933d at the electric vehicle induction coil module 943d. The conductive shield 933d stays with the electric vehicle battery unit body. The protective layer 935d (e.g., plastic layer) is provided between the conductive layer 933d and the electric vehicle induction coil module 943d when the electric vehicle induction coil module 943d is not in a deployed state. The physical separation of the electric vehicle induction coil module 943d from the electric vehicle battery unit body may have a positive effect on the induction coil's performance. Additionally, the coil 937d and ferrite material 939d may be covered in part by a separate protective housing 941d of plastic.

As discussed above, the electric vehicle induction coil module 943d that is deployed may contain only the mutli-turn coil 937d (e.g., Litz wire) and ferrite material 939d. Ferrite backing may be provided to enhance coupling and to prevent excessive eddy current losses in a vehicle's underbody or in the conductive layer 933d. Moreover, the electric vehicle induction coil module 943d may include a flexible wire connection to power conversion electronics and sensor electronics. This wire bundle may be integrated into the mechanical gear for deploying the electric vehicle induction coil module 943d.

Figure 10:
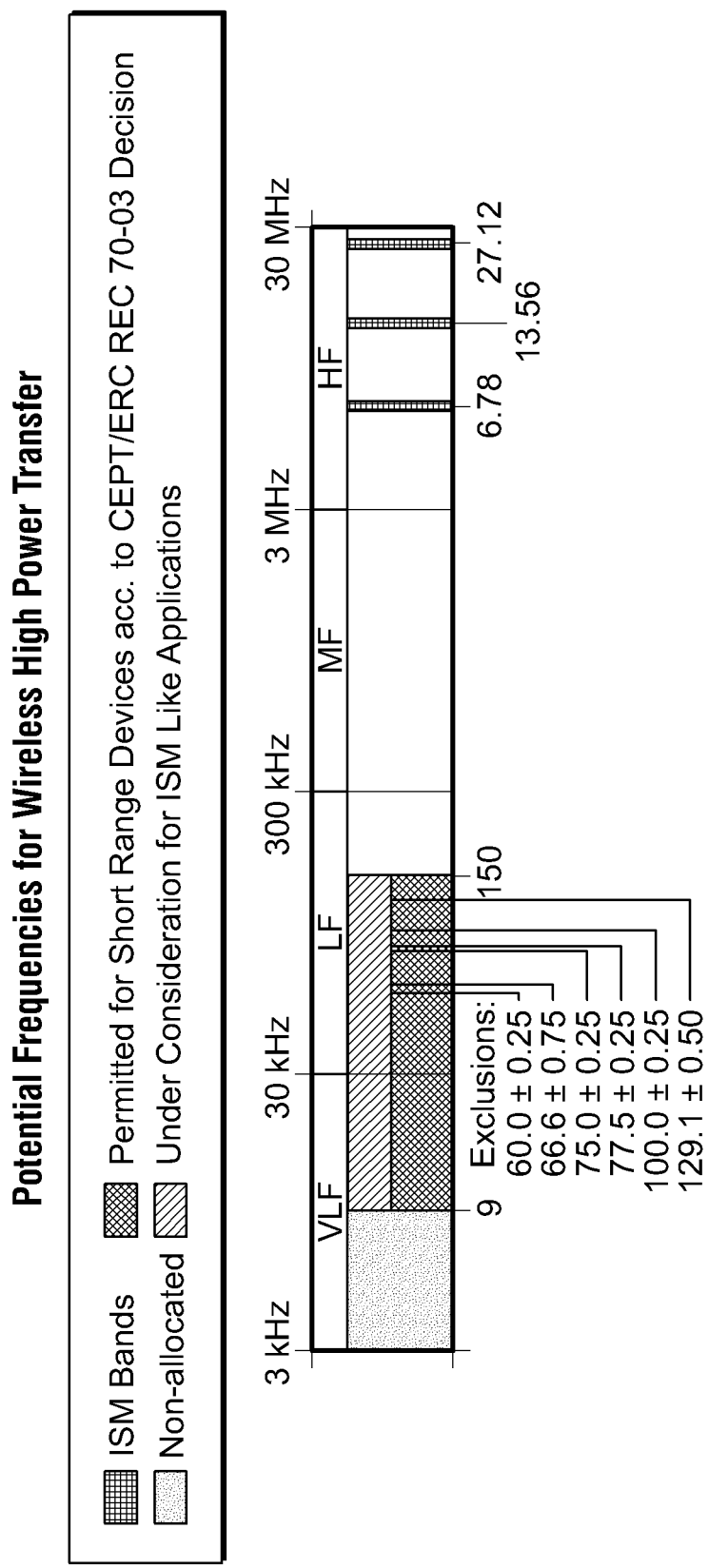
FIG. 10 is a chart of a frequency spectrum showing exemplary frequencies that may be available for wirelessly charging an electric vehicle, in accordance with an exemplary embodiment of the invention.

FIG. 10 is a chart of a frequency spectrum showing exemplary frequencies that may be used for wirelessly charging an electric vehicle, in accordance with an exemplary embodiment of the invention. As shown in FIG. 10, potential frequency ranges for wireless high power transfer to electric vehicles may include: VLF in a 3 kHz to 30 kHz band, lower LF in a 30 kHz to 150 kHz band (for ISM-like applications) with some exclusions, high frequencies (HF) 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 11:
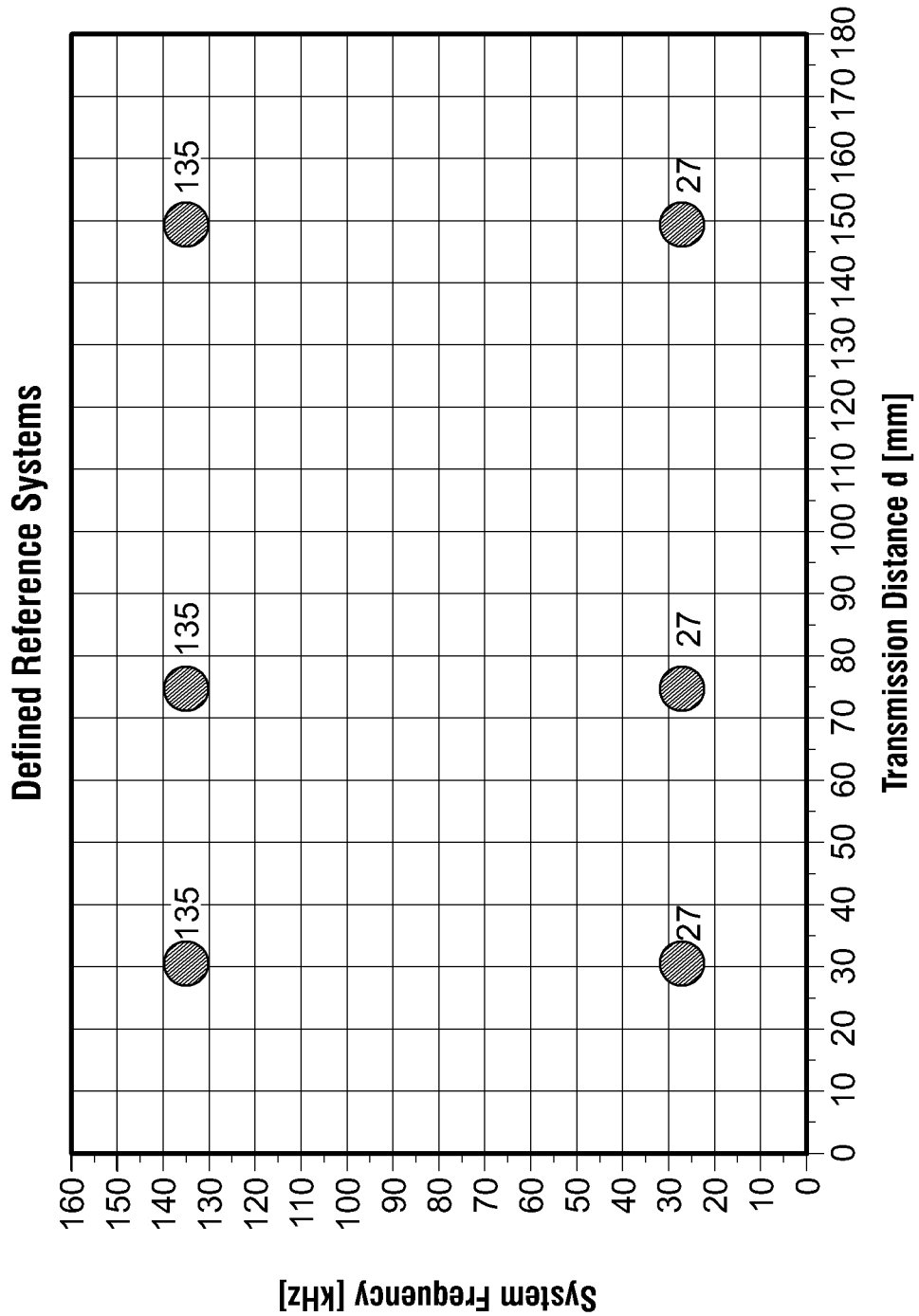
FIG. 11 is a chart showing exemplary frequencies and transmission distances that may be useful in wireless charging electric vehicles, in accordance with an exemplary embodiment of the invention.

FIG. 11 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

Many considerations may be taken into account when determining a suitable frequency for a wireless power transfer system 100. For example, resonance characteristics and the coupling-mode region of the base system induction coil and the electric vehicle induction coil may be factors when choosing a suitable frequency. In addition, wireless power frequencies may interfere with frequencies used for other applications. As non-limiting examples, there may be VLF/LF coexistence issues with power line frequencies, audible frequencies and communication frequencies. Non-limiting examples where coexistence may be an issue for VLF and LF are: frequencies for a radio controlled clock, frequencies for long wave AM broadcasts and other radio services, cross-coupling to ISDN/ADSL and ISDN/xDSL communication channels, electronic vehicle immobilization systems, RFID (Radio Frequency Identification) systems, EAS (Electronic Article Surveillance) systems, on-site paging, Low Voltage PLC systems, medical implants (cardiac pacemakers, etc.), audio systems, and acoustic emission perceivable by humans and animals. Long wave AM broadcasts may use a frequency range between 149 kHz and 284 kHz and may be broadcast from high power transmitters to mobile and fixed receivers in a range of less than five hundred kilometers.

Furthermore, non-limiting examples where coexistence may be an issue for HF are industrial, scientific and medical (ISM) radio bands, such as: 6.78 MHz for remote control applications and RFID in full duplex (FDX) or half duplex (HDX) mode with continuous energy transfer; 13.56 MHz for RFID in FDX or HDX mode with continuous energy transfer as well as portable device wireless power; and 27.12 MHz for railway applications (e.g., Eurobalise 27.095 MHz), citizen band radio, and remote control (e.g., models, toys, garage door, computer mouse, etc.).

In another non-limiting example, the base charging system power converter 736 and its controller 742 in FIG. 7 may be configured to control various aspects of power conversion including regulating a duty cycle for selectively adjusting the base charging system power converter 736 to generate magnetic near field for wireless power transmission. The base charging system controller 742 may also either reduce or suspend generation of the magnetic near field during a wireless power transmission pause interval or adjust an operating frequency. The transmission pause interval may result in a suspension of generation of any jamming signals that may inhibit, for example, a wireless communication device such as a radio controlled clock from receiving a desired radio station signal. Furthermore, during a vehicle-to-grid configuration, the electric vehicle controller 744 may similarly regulate a duty cycle for selectively adjusting the electric vehicle power converter to generate magnetic near field for wireless power transmission and either reduce or suspend generation of the magnetic near field during a wireless power transmission pause interval or adjust an operating frequency.

Figure 12:
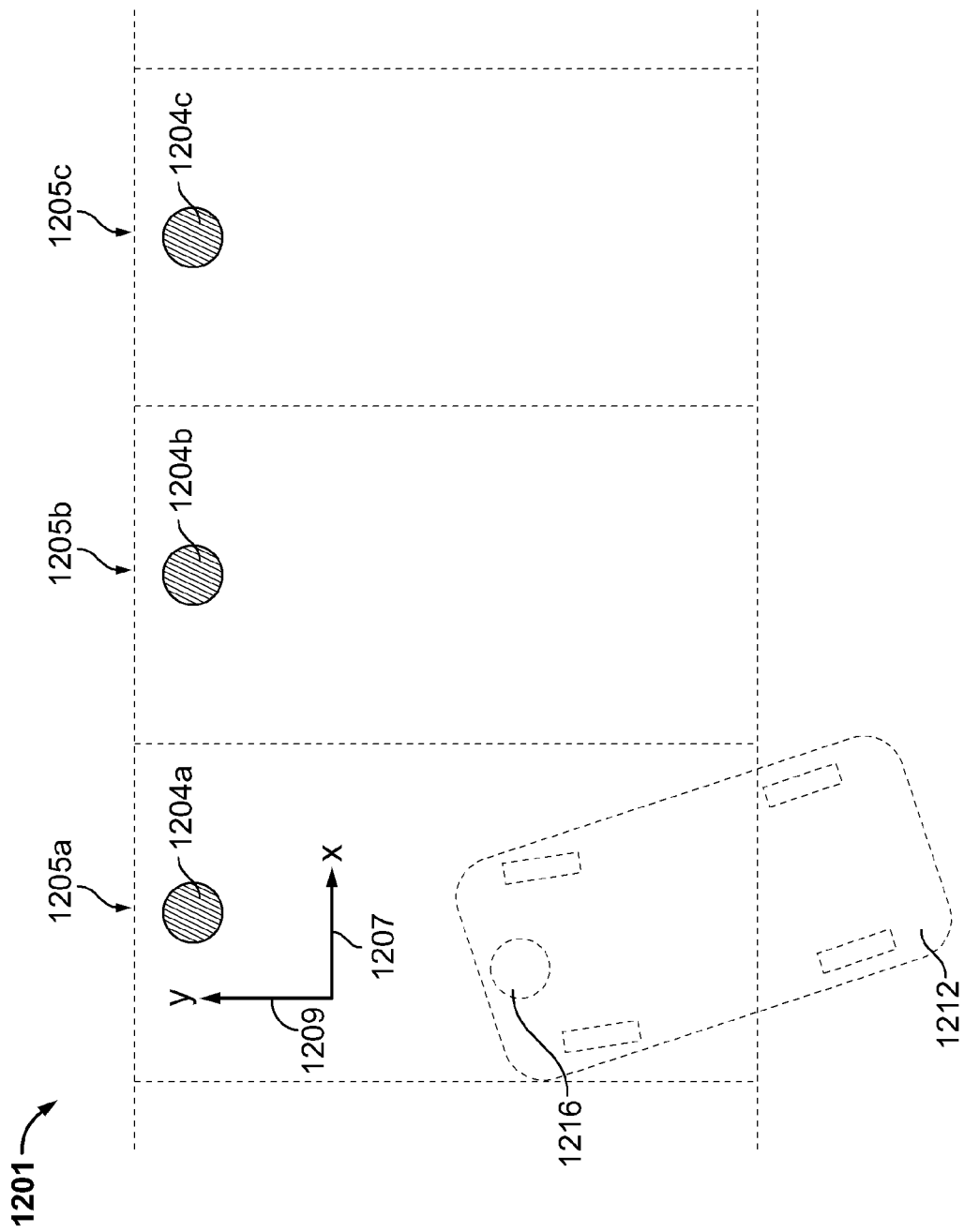
FIG. 12 is a diagram of a parking lot including a plurality of parking areas and an exemplary charging base positioned within each parking area.

The wireless power transfer systems described above may be used in a variety of locations for charging an electric vehicle, or transferring power back to a power grid. For example, the transfer of power may occur in a parking lot environment. FIG. 12 is a diagram of a parking lot 1201 including a plurality of parking areas 1205a, 1205b, and 1205c and an exemplary charging base positioned within each parking area 1205a, 1205b, and 105c. It is noted that a "parking area" may also be referred to herein as a "parking space." To enhance the efficiency of a wireless power transfer system, an electric vehicle 1212 may be aligned along an X direction (depicted by arrow 1207 in FIG. 12) and a Y direction (depicted by arrow 1209 in FIG. 12) to enable an electric vehicle induction coil 1216 within the electric vehicle 1212 to be adequately aligned with a base system induction coil 1204 within an associated parking area 1205. Although parking areas 1205 in FIG. 12 are illustrated as having a single base system induction coil 1204 and base wireless power charging system (not shown), the parking areas 1205 may also include multiple base system induction coils 1204 and base wireless power charging systems.

Furthermore, the disclosed embodiments are applicable to parking lots 1201 having one or more parking spaces or parking areas 1205a, 1205b, and 1205c, wherein at least one parking space 1205a within a parking lot may include a base wireless power charging system. Guidance systems (not shown) may be used to assist a vehicle operator in positioning an electric vehicle 1212 in a parking area 1205 to align an electric vehicle induction coil 1216 within the electric vehicle 1212 with a base system induction coil 1204. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 1212 to enable the electric vehicle induction coil 1216 to be adequately aligned with a base system induction coil 1204 within a base wireless charging system.

As discussed above, the electric vehicle wireless charging system (not shown) may be placed on the underside of the electric vehicle 1212 for transmitting and receiving power from a base wireless charging system. For example, an electric vehicle induction coil 1216 may be integrated into the vehicles underbody near a center position providing safe distance to electromagnetic exposure and permitting forward and reverse parking of the electric vehicle 1212.

In order to achieve maximum power under regulatory and human exposure constraints (electromagnetic field strength limits) and transfer efficiencies comparable to wired charging solutions, the air gap between the base system induction coil 1204 and electric vehicle induction coil 1216 may be set as small as possible. However, the air gap cannot be reduced, for a non-limiting example, simply by a 'low-slung' electric vehicle induction coil 1216 since vehicles should provide a certain minimum chassis-ground clearance. Minimum ground clearance may depend on the vehicle category (city car, off-road vehicle, etc.) and may be manufacturer specific or defined by existing standards or recommendations.

The placement of the electric vehicle wireless charging system including the electric vehicle induction coil 1216 on the underside of the electric vehicle 1212 may encounter various obstructions during operation or motion of the electric vehicle 1212.

Figure 13A:
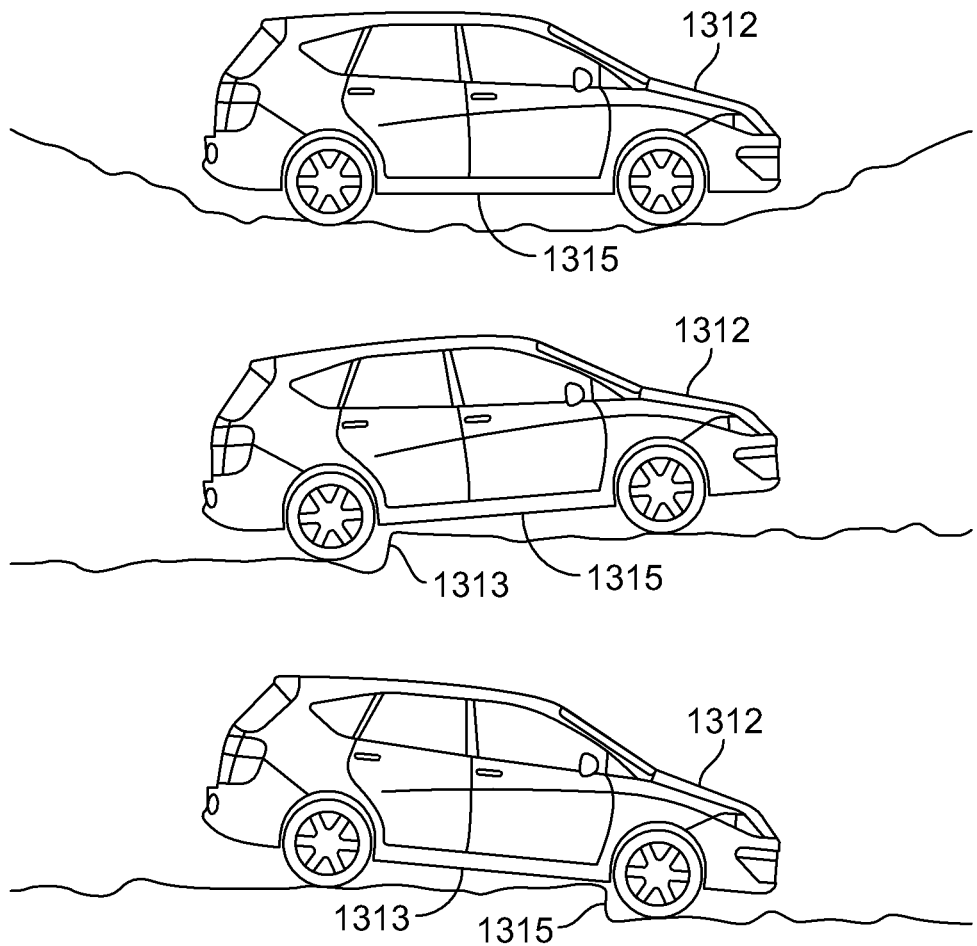
FIG. 13A is a diagram showing examples of various obstructions that may be encountered by a vehicle, which may require chassis clearance.

FIG. 13A is a diagram showing examples of various obstructions 1313 that may be encountered by an electric vehicle 1312, which may require chassis clearance. The obstructions 1313 may contact the chassis underside 1315 of the chassis of the electric vehicle 1312 at different locations. When an electric vehicle induction coil (not shown) is located within or near the chassis underside 1315 of the electric vehicle 1312, the electric vehicle induction coil may become damaged, misaligned, or have other problems associated with obstructions 1313 contacting the induction coil.

Figure 13B:
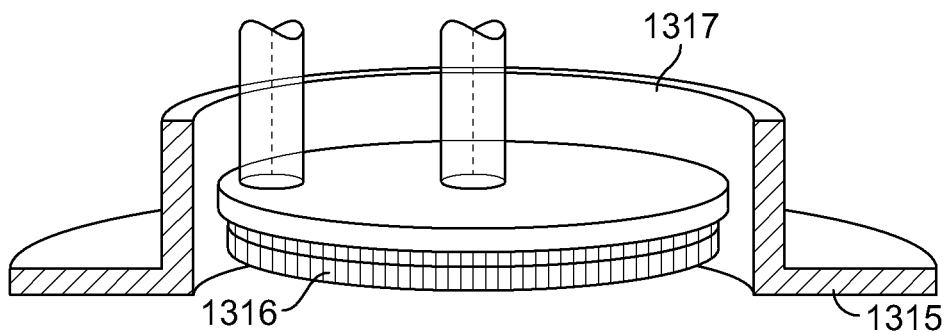
FIG. 13B is a perspective view of an exemplary wireless power coil located within a cavity of the underside of the chassis of a vehicle according to an embodiment of the present invention.

FIG. 13B is a perspective view of an exemplary wireless power induction coil 1316 located within a cavity 1317 of the underside 1315 of the chassis of a vehicle according to an embodiment of the present invention. In order to protect the electric vehicle induction coil 1316 from undesirable contact from obstructions, the electric vehicle induction coil 1316 may be placed within a cavity 1317 of the chassis underside 1315 of the electric vehicle 1312. As discussed above with reference to FIG. 9D, the electric vehicle induction coil 1316 may be deployable for transmitting or receiving wireless power from a base system induction coil (not shown).

A mechanically deployable induction coil may provide high end-to-end efficiency (e.g., well above 90%), support charge power levels considerably above 3 kW, and cope with any ground clearance requirement that might be specified for an electric vehicle 1312 (e.g. >20 cm). A mechanically deployable induction coil may also support both ground-embedded and surface mount base system induction coil installations, and operate at low emission and exposure levels. The deployable induction coil may also compensate for induction coil misalignment providing increased tolerance and thus increased parking convenience to the driver.

Induction coil separation and thus reduced coupling may also help to suppress induction coil current harmonics as generated by switched-mode power conversion. Loosely coupled systems may provide inherent selectivity to attenuate unwanted emission levels at harmonic frequencies. Though induction coil current linkage and field strength may increase by reducing coupling, there may generally be a net benefit in reduced harmonics emission levels, which may supersede any supplementary harmonics filtering, reducing circuit complexity and losses.

With reference to FIG. 1, in another exemplary embodiment, a base wireless charging system 102a may include mechanical or electronic components (e.g., processor) that may be used for position adjustment of the base system induction coil 104a as will be described herein. Components of the base wireless charging system 102a may be housed within a base wireless charging system 102a that is at least partially embedded below a ground surface, such as the ground surface of a parking lot, driveway, or garage.

Figure 14A:
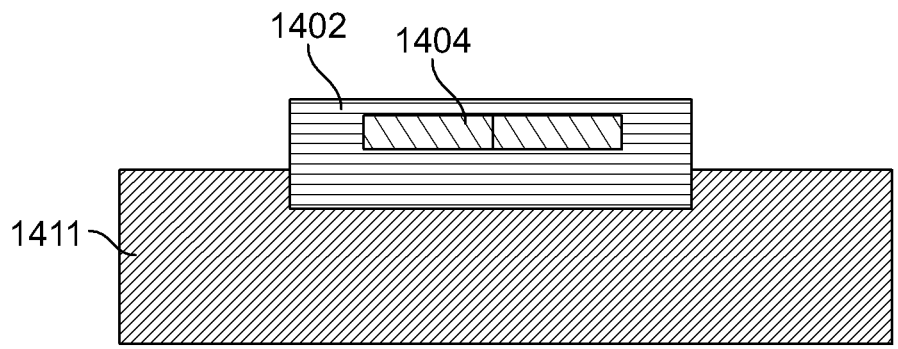
FIGS. 14A, 14B, and 14C are diagrams of exemplary variants of embedding a charging base according to some embodiments.
Figure 14B:
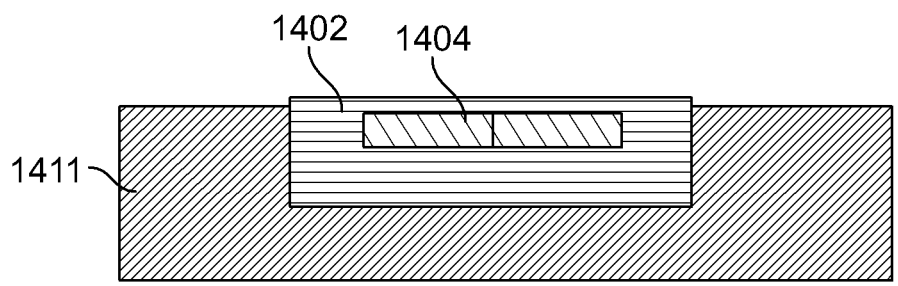
Figure 14C:
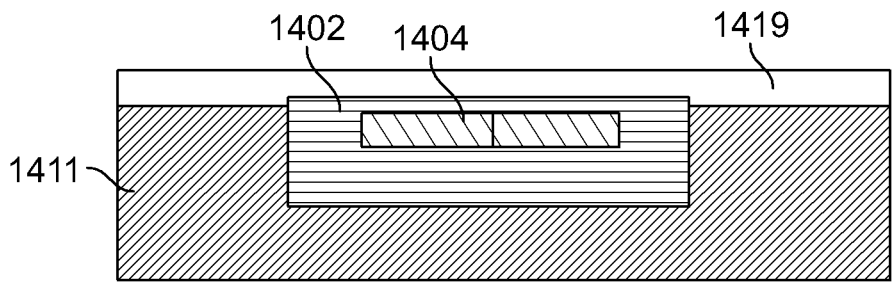

FIGS. 14A, 14B, and 14C are diagrams of exemplary variants of embedding a charging base 1402 according to some embodiments. The base wireless charging system 1402 may include one or more base system induction coils 1404 for transmitting or receiving a wireless power signal to/from a corresponding electric vehicle induction coil (not shown) associated with an electric vehicle. As illustrated in FIG. 14A, the base wireless charging system may be protrusive from a surface of the ground 1411, which may improve coupling as the distance between the base system induction coil 1404 and electric vehicle induction coil may be reduced. Furthermore, a protrusive base wireless charging system 1402 may be more accessible for maintenance and repair.

Alternatively, as illustrated in FIG. 14B, the base wireless charging system 1402 may be flush with the surface of the ground 1411. A flush base wireless charging system may be more accessible for maintenance and repair and non-impedimental. However, coupling between the base system induction coil 1404 and the electric vehicle induction coil may be reduced in comparison to the protrusive base wireless charging system of FIG. 14A.

Alternatively, as illustrated in FIG. 14C, a base wireless charging system 1402 may be located completely below the surface of the ground 1411 (e.g., below the asphalt layer 1419). Such a below-surface base wireless charging system 1402 may be more secure from intruders (e.g., vandalism), and be non-impedimental. In a sheltered environment, such as home garages and multistory car parks, a surface mount low profile base system induction coil 1404 may be used. This may be particularly true if ground material is iron reinforced concrete rendering ground embedding difficult and expensive.

As described above, efficient and safe high power transfer may be impacted by the distance between a base system induction coil 204 and an electric vehicle induction coil 216 (FIG. 2). Reducing the distance may be difficult in some cases where, for example, a base system induction coil 204 is embedded in the ground while the electric vehicle induction coil 216 may be built within a chassis of an electric vehicle. As also described above, careful alignment between base system induction coil 204 and the electric vehicle induction coil 216 may often be desirable to increase the efficiency of power transfer. This may require mechanical (kinematic) components for alignment of either or both of the base system induction coil 204 and the electric vehicle induction coil 216. Design of kinematic alignment system requiring physical moving parts for an automotive environment may be difficult. Furthermore it may be difficult to connect a high voltage power cable from a deployable/moving base system induction coil 204 or electric vehicle induction coil to the power conversion circuitry. As such, one aspect of various embodiments is directed to providing methods and system for overcoming these difficulties.

Figure 15:
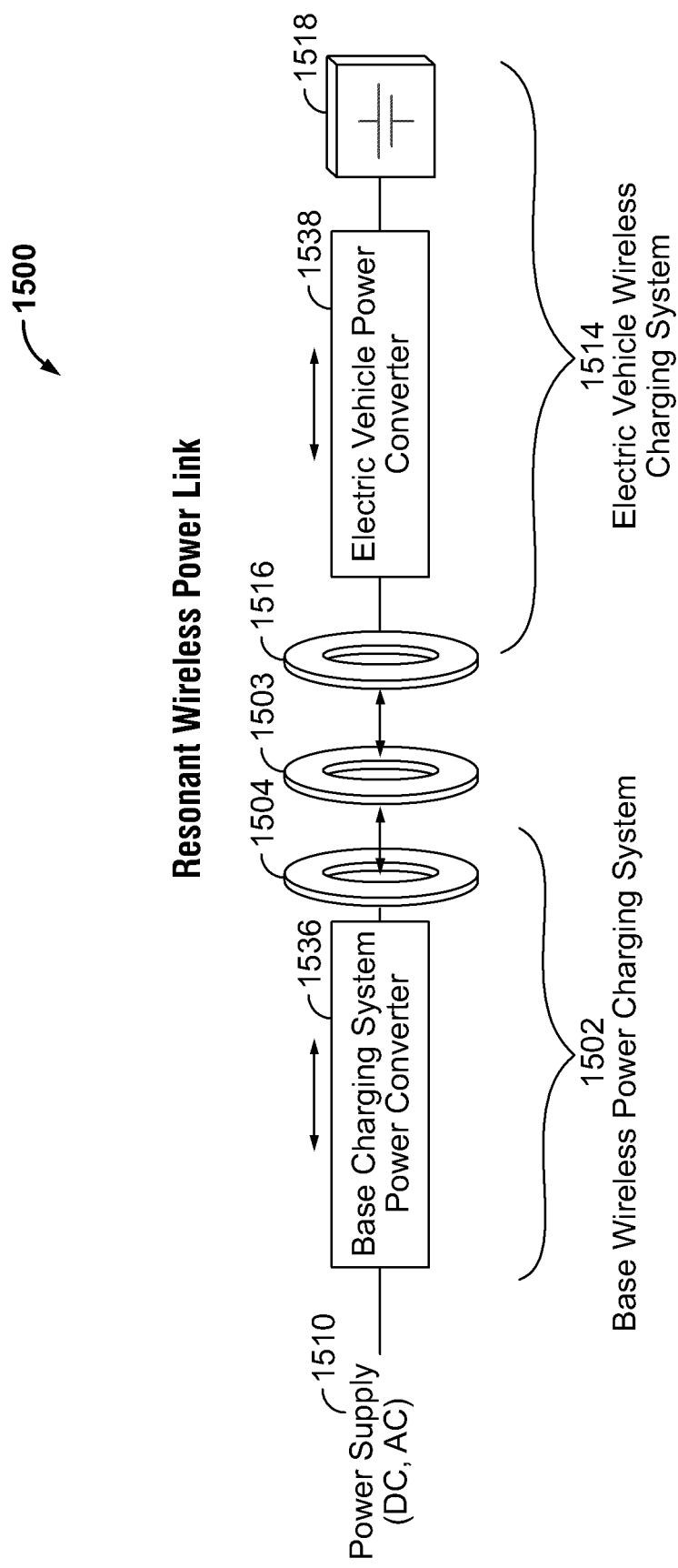
FIG. 15 is a functional block diagram of exemplary components of the wireless power transfer system including a passive circuit including a passive circuit induction coil.

FIG. 15 is functional block diagram of exemplary components of the wireless power transfer system 1500 as shown in FIG. 2 including a passive circuit including passive circuit induction coil 203. The wireless power transfer system 1500 includes the components as shown in FIG. 2 as well as a passive circuit induction coil (or parasitic circuit including a parasitic coil) 1503 that may be selectively positioned between a base system induction coil 1504 and an electric vehicle induction coil 1516. The passive circuit induction coil 1503 may be used to couple energy from the filed produced by the base system induction coil 1504 and wirelessly relay the energy for coupling by the electric vehicle induction coil 1516 without requiring any additional electrical connections between either the base wireless power charging system 1502 or the electric vehicle wireless charging system 1514.

Similar to the base system induction coil 1504 and electric vehicle induction coil 1516, the passive circuit induction coil 1503 may be configured as a "loop" antenna, and more specifically, multi-turn loop antennas or coils. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

Efficient energy transfer may occur by coupling a large portion of the energy in the near field of a base system induction coil 1504 to an electric vehicle induction coil 1516 via a passive circuit induction coil 1503 (also referred to herein as parasitic antenna or parasitic coil) rather than propagating most of the energy in an electromagnetic wave to the far-field. When in this near field, a coupling mode may be developed between the base system induction coil 1504, passive circuit induction coil 1503, and the electric vehicle induction coil 1516.

In FIG. 15, a power supply 1510, which may be an AC or DC power supply, supplies power to a base charging system power converter 1536, assuming energy transfer towards vehicle. The base charging system power converter 1536 drives the base system induction coil 1504 to emit a desired frequency signal. If the base system induction coil 1504, the passive circuit induction coil 1503, and electric vehicle induction coil 1516 are tuned to substantially common (i.e., the same) frequencies and are close enough to be within the near-field radiation from the base system induction coil 1504, the base system induction coil 1504 and electric vehicle induction coil 1516 may couple such that power may be transferred to the electric vehicle induction coil 1516 and extracted in the electric vehicle power converter 1538 via the passive circuit induction coil. The electric vehicle power converter 1538 may then charge a battery unit 1518. The power supply 1510, base charging system power converter 1536, and base system induction coil 1504 include the infrastructure of a base wireless power charging system 1502, which may be stationary and located at a variety of locations as discussed above. The battery unit 1518, electric vehicle power converter 1538, and electric vehicle induction coil 1516 may make up an electric vehicle wireless charging system 1514 that is part of an electric vehicle or part of a battery pack.

Input power, in one exemplary embodiment, is provided from the power supply 1510 such that the base system induction coil 1504 generates a near-field for providing the energy transfer. A passive circuit including the passive circuit induction coil 1503 may couple to the near field and generate an extended near field at a region closer to the electric vehicle induction coil 1516. The electric vehicle induction coil 1516 may couple to the near-field that is "extended" by the passive circuit induction coil 1503 and generates output power for storing or consumption by the electric vehicle 1512. In other exemplary embodiments, the base system induction coil 1504, passive circuit induction coil 1503, and electric vehicle induction coil 1516 are configured according to a mutual resonant relationship. When the resonant frequency of the coils 1504, 1503, and 1516 are close, transmission losses may be reduced when the electric vehicle induction coil 1516 is located in the near-field of the passive circuit induction coil 1503 and the passive circuit induction coil 1503 is located in the near field of the base system induction coil 1504.

As such, a passive circuit including a passive circuit induction coil 1503 may form a resonant structure that is capable of efficiently coupling energy from a base system induction coil 1504 to an electric vehicle induction coil 1516. Coupling may be also known as "magnetic coupled resonance" and "resonant induction." It should be appreciated that even when resonance between the base system induction coil 1504, the passive circuit induction coil 1503, and the electric vehicle induction coil 1516 are not matched, energy may be transferred at a lower efficiency. The resonant frequency of the passive circuit induction coil 1503 may be based on its inductance and capacitance. Inductance may be simply the inductance created by a loop making up the passive circuit induction coil 1503. Capacitance may be added to the passive circuit induction coil 103 to create a resonant structure (i.e., the passive circuit) at a desired resonant frequency. In certain cases, the self capacitance of the induction coil is solely used or used in addition to create a resonant structure. In yet another example, a capacitor may be added in series with the passive circuit induction coil 1503 to create a resonant circuit that generates a magnetic field. In some cases the passive circuit induction coil 1503 may be "self resonant" as will be further described below that may not need additional capacitance added beyond the capacitance of a loop itself.

Figure 16A:
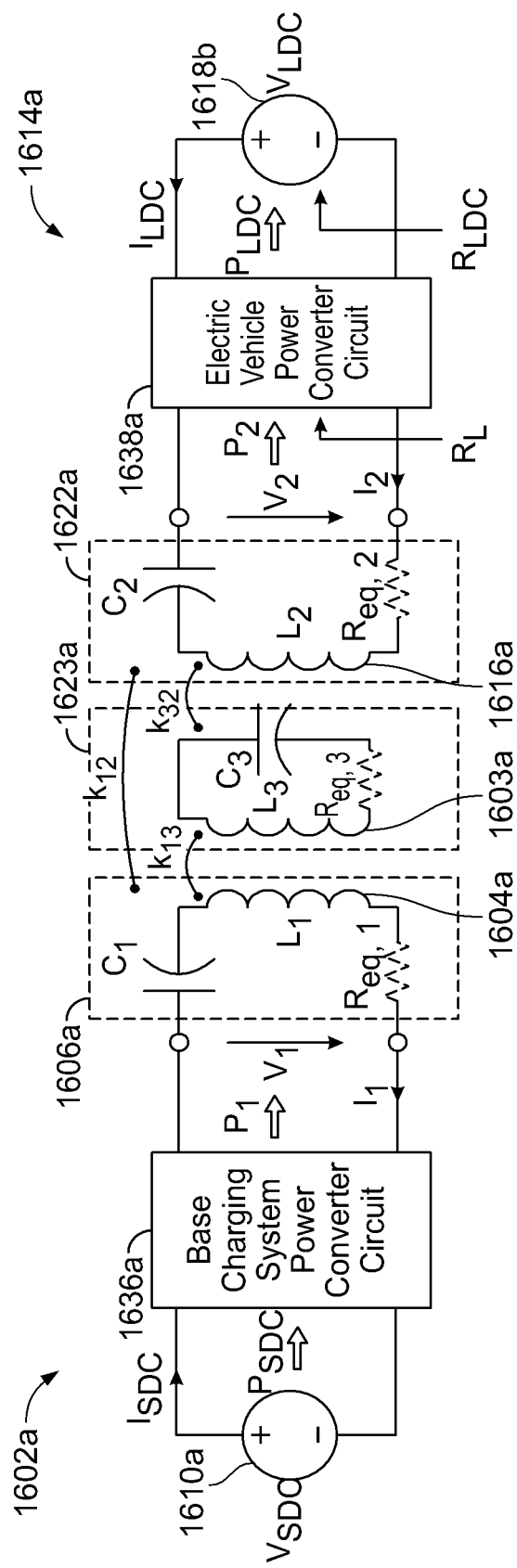
FIG. 16A is a schematic diagram of exemplary components of the wireless power transfer system of FIG. 15 including a passive circuit including a passive circuit induction coil.

FIG. 16A is a schematic diagram of exemplary components of the wireless power transfer system 1500 of FIG. 15 including a passive circuit 1623a including a passive circuit induction coil. In addition to the components shown in FIG. 3, the wireless power transfer system includes a resonant passive circuit 1623a including a passive circuit induction coil 1603a. The passive circuit induction coil 1603a as described herein may be referred to as or configured as a capacitively loaded induction coil 1603a. The resonant passive circuit 1623a has an inductance $L_3$ and a capacitance $C_3$ that may be chosen such to resonate at a chosen frequency. An equivalent resistance $R_{eq,3}$ represents the losses that may be inherent to the passive circuit induction coil and the anti-reactance capacitors. Mutual coupling coefficients $k_{13}$, $k_{32}$, and $k_{12}$, represent the mutual coupling coefficient resulting at coil separation between the base system induction coil 1604a and passive circuit induction coil 1603a, the passive circuit induction coil 1603a and electric vehicle induction coil 1616a, and the base system induction coil 1604a and electric vehicle induction coil 1616a, respectively.

A passive circuit 1623a may be formed from purely passive components including a passive circuit induction coil 1603a and a resonance capacitor forming a resonant tank circuit 1623a without electrical connections such as shown in FIG. 16A. The passive circuit induction coil 1603a (which may be referred to as a parasitic structure or a parasitic resonator) may couple to both the base system induction coil 1604a and electric vehicle induction coil 1616a via the magnetic near field and do not require any electrical connection. The passive circuit induction coil 1623a may be sealed, which may be advantageous if located in a harsh environment.

In addition, the passive circuit induction coil 1623a may be mechanically displaceable from either the base system induction coil 1604a or the electric vehicle induction coil 1616a. As no electrical connections are required from the passive circuit induction coil 1623a, the mechanics for deployment and alignment of the passive circuit induction coil 1623a may be simplified as wires may be subject to wear, tear, and insulation damage. In some embodiments, the passive circuit induction coil 1603a may be part of the electric vehicle (not shown), stowed below the electric vehicle's underbody when not in use.

As the passive circuit induction coil 1603 may be configured to couple to the base system induction coil 1604 and electric vehicle induction coil 1616, the magnetic path may not be obstructed by metallic parts in the close proximity of the passive circuit induction coil 1603, base system induction coil 1604, and electric vehicle induction coil 1616. Metallic parts may reduce coupling and increase losses due to eddy currents.

In one embodiment, the passive circuit induction coil 1603a may be a self-resonant coil that resonates due to its self-capacitance rather than adding a capacitor which may be largely metallic. The L-C ratio of a passive circuit induction coil 1603 may have no effect on transfer efficiency if a Q-factor may be maintained. A self resonant passive circuit induction coil 1603a may take a variety of form factors and volumes.

Self capacitance and inductance of a coil may increase with the number of turns of the coil. Thin wire coils with a high number of turns may exhibit a self-resonance at relatively low frequency. Resonant frequency may be further decreased by embedding windings into a dielectric material of high permittivity. A desirable dielectric may be one with extremely low losses (high Q or low tangent δ) and one that can sustain high electric field strength (high voltage breakdown).

The advantage of a self-resonant high permittivity embedded coil may be that the space between windings that normally serves as insulation may be reused to store electric field energy which is capacitance. Additionally, copper windings of the coils that normally serve to store magnetic field energy (i.e., inductance) may serve as 'metallic plates' of the capacitor.

Assuming wire thickness being in the order of skin depth or below, skin effect and proximity effect losses may become negligible as the coil's AC resistance approaches its DC resistance.

A self resonant coil may be considered as a wound transmission line with a high inductance and high capacitance per unit length, thus slow wave propagation. Since coil will be open-terminated at both of its ends, coil current along the wire may be non-uniform and virtually zero at wire ends. Assuming a sinusoidal current distribution about $(1-2/\pi)=36\%$ of volume may be wasted. However, in some cases, self resonant coils may outperform classical resonator designs using external capacitance. To avoid voltage breakdown or arcing, a self resonant passive circuit induction coil 1603a may be designed for a lower L-C ratio requiring thicker wire. Thicker wire in turn may either introduce loses due to skin effects or, if Litz wire is used, only a portion of its cross-sectional area can be exploited. Moreover, there may be some eddy current losses in metallic parts of the external capacitor.

Tuning of resonant frequency of a self-resonant disk coil may be performed at fabrication by designing the coil for a slightly lower frequency and then cutting off of some outer windings (e.g., user laser techniques) until its resonance is within a specified tolerance. Hybrid solutions using self-capacitance as well as external capacitance may also be used. For a hybrid solution, external capacitance may be added or removed until resonance occurs at specified frequency.

Figure 16B:
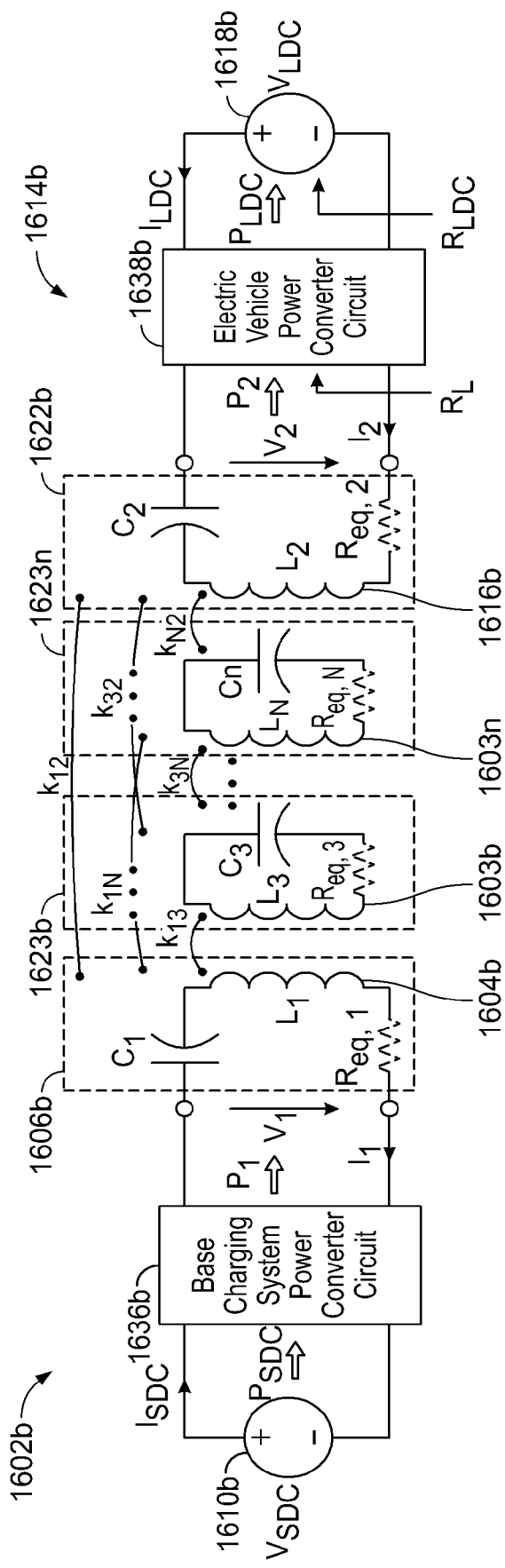
FIG. 16B is a schematic diagram of exemplary components of the wireless power transfer system of FIG. 15 including two a plurality of passive circuits including passive circuit induction coils.

FIG. 16B is a schematic diagram of exemplary components of the wireless power transfer system of FIG. 15 including a plurality of passive circuits 1623b-1623n including passive circuit induction coils 1603b-1603n. In comparison to FIG. 16A, any number of passive circuits 1632b-1623n may be provided. The passive circuits 1632b-1632n include passive circuit induction coils 1603b-1603n having inductances $L_3$-$L_n$, respectively. Individual capacitances $C_3$-$C_n$, represent the capacitance of the resonant passive induction circuits 1632b-1632n used to form resonant circuits that resonate at a desired frequency. The individual equivalent resistances $R_{eq,3}$-$R_{eq,n}$, represent the losses that may be inherent to the passive circuit induction coil and the anti-reactance capacitors. Mutual coupling factors $k_{13}$, $k_{3N}$, $k_{N2}$, $k_{1N}$, $k_{32}$, and $k_{12}$ represent the mutual coupling coefficient resulting at coil separation between the base system induction coil 1604 and a first passive circuit induction coil 1603b, the first passive circuit induction coil 1603b and an $n^{th}$ passive circuit induction coil 1603n, the $n^{th}$ passive circuit induction coil 1603n and the electric vehicle induction coil 1616, the base system induction coil 1604 and $n^{th}$ passive circuit induction coil 1603n, the first passive circuit induction coil 1603a and electric vehicle induction coil 1616, and the base system induction coil 1604 and electric vehicle induction coil 1616, respectively.

Figure 17A:
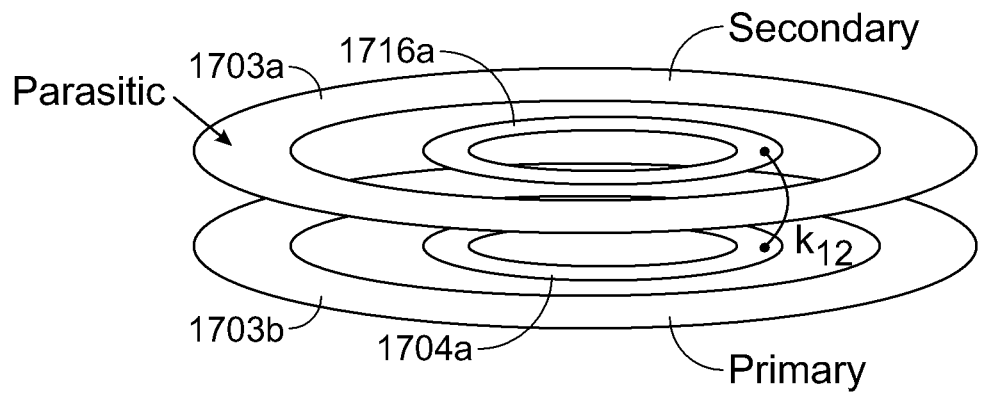
FIGS. 17A and 17B are diagrams showing two passive circuit induction coils of passive circuits in coplanar arrangements with a primary and secondary induction coil respectively at different distances.
Figure 17B:
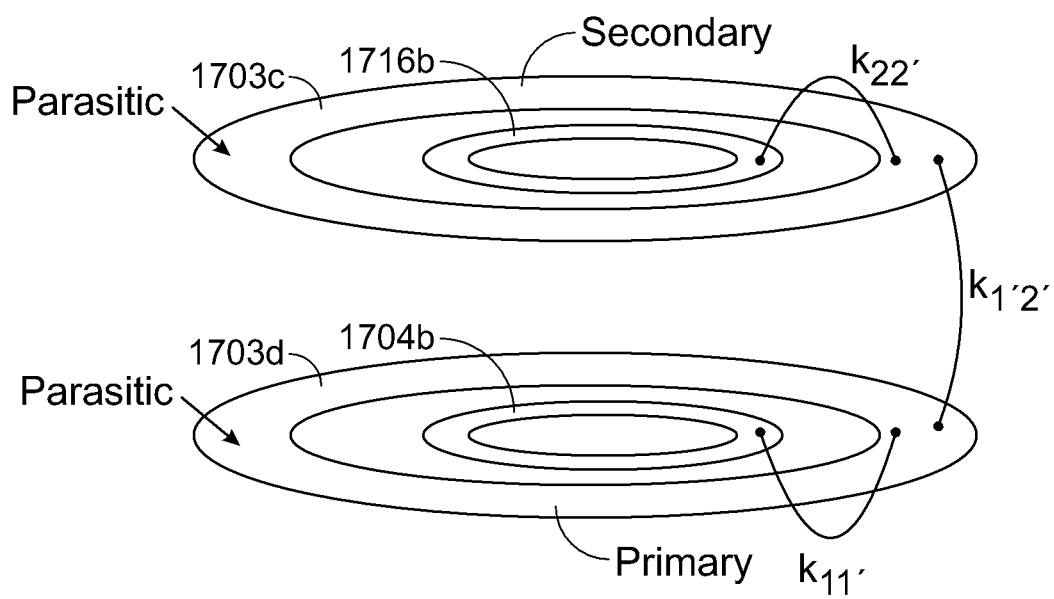

FIGS. 17A and 17B are diagrams showing two passive circuit induction coils 1703a and 1703b of passive circuits in coplanar arrangements with a primary and secondary induction coil 1704a and 1716a respectively at different distances. As shown, a passive circuit induction coil 1703a may be coplanar with a secondary coil (e.g., an electric vehicle induction coil 1716a) and another passive circuit induction coil 1703b may additionally be coplanar with a primary induction coil 1704a. A coplanar arrangement may allow for more efficient energy transmission and better coupling between a passive circuit induction coil 1703a and the other coplanar coil. If the primary and secondary coils 1704a and 1704b are close together as shown in FIG. 17A, passive coupling via the passive circuit induction coils 1703a and 1703b may be less effective as the near field regions overlap. However for larger air gaps as shown in FIG. 17B, coupling using the passive circuit induction coils 1703a and 1703b becomes more effective. Coupling coefficients $k_{1 1'}$, $k_{1'2'}$, and $k_{2 2''}$, are shown between each passive circuit induction coil 1703c and 1703c and their respective coplanar coils 1704b and 1716b along with the coupling coefficients between the primary 1704b and the secondary 1716b.

Figure 18:
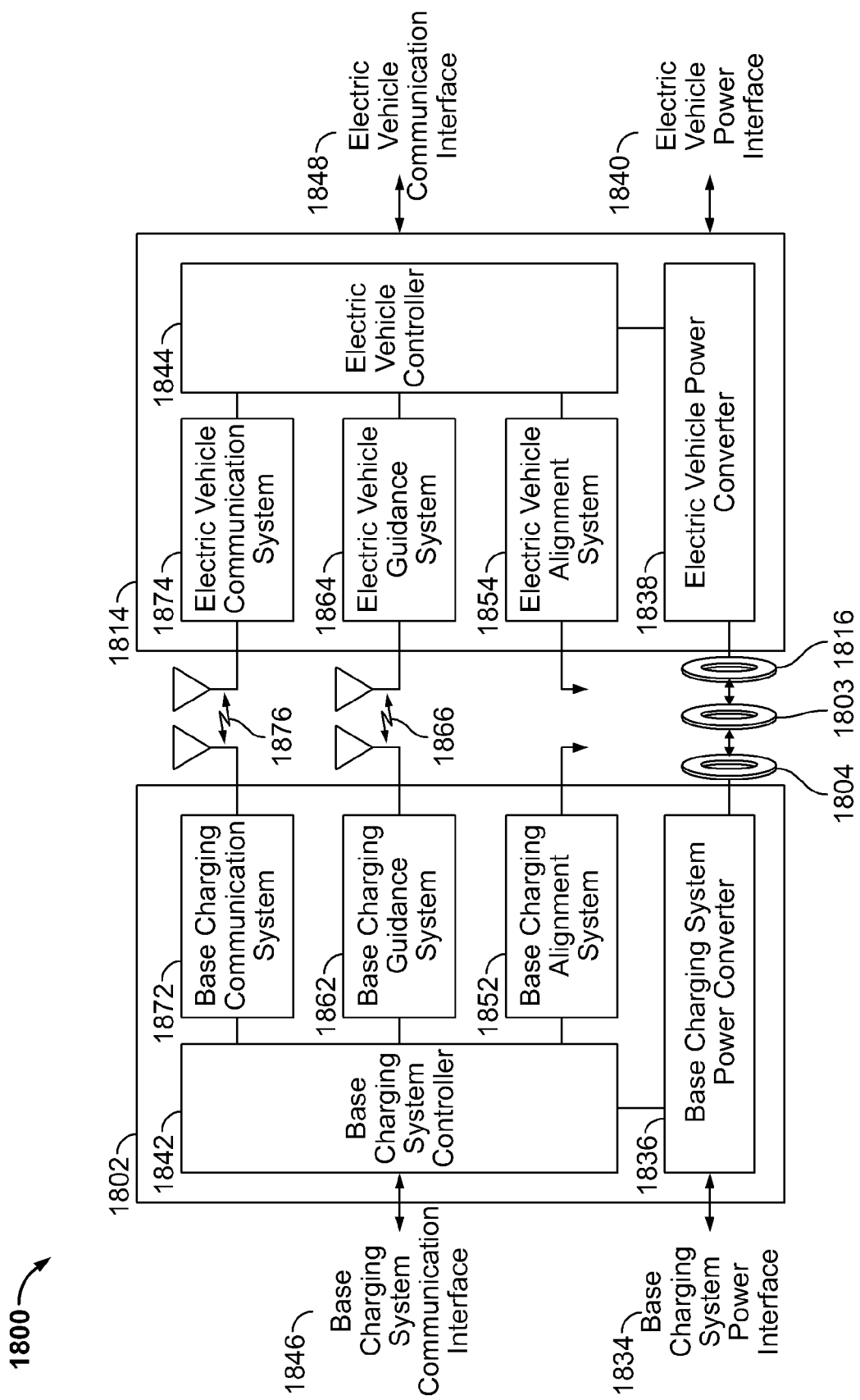
FIG. 18 is functional block diagram showing exemplary core and ancillary components of the wireless power transfer system including a passive circuit including a passive circuit induction coil.

FIG. 18 is a functional block diagram showing exemplary core and ancillary components of the wireless power transfer system 1800 including a passive circuit including a passive circuit induction coil 1803. FIG. 18 includes the components shown in FIG. 7 with the addition of the passive circuit including the passive circuit induction coil 1803. Furthermore, the electric vehicle alignment system 1854 may further be configured to adjust the position of the passive circuit induction coil 1803.

As with the exemplary embodiment of FIG. 7, and assuming energy flow towards BEV, in FIG. 18, the base charging system power converter 1836 may receive AC or DC power from the base charging system power interface 1834 to excite the base system induction coil 1804 at or near its resonant frequency. The passive circuit including the passive circuit induction coil 1803, when in the near field coupling-mode region, receives energy from the near field coupling mode region to oscillate at or near the resonant frequency. The electric vehicle induction coil 1816, when in the near field coupling mode region, receives energy from the near field coupling mode region of the passive circuit including the passive circuit induction coil 1803 to oscillate at or near the resonant frequency. The electric vehicle power converter 1838 converts the oscillating signal from the electric vehicle induction coil 1816 to a power signal suitable for charging a battery (not shown) via the electric vehicle power interface 1840.

A base charging alignment system 1852 may communicate with an electric vehicle alignment system 1854 to provide a feedback mechanism for more closely aligning the base system induction coil 1804, the passive circuit induction coil 1803, and electric vehicle induction coil 1816, either autonomously or with operator assistance. Similarly, a base charging guidance system 1862 may communicate with an electric vehicle guidance system 1864 to provide a feedback mechanism to guide an operator in aligning the base system induction coil 1804, the passive circuit induction coil 1803, and electric vehicle induction coil 1816.

The electric vehicle induction coil 1816 and the passive circuit induction coil 1803 may be integrated flush with a bottom side of a battery unit on the vehicle body (not shown) so that there are no protrusive parts and a specified ground-to-vehicle body clearance can be maintained. This configuration may require some room in the battery unit dedicated to electric vehicle wireless charging system 1814.

In some exemplary embodiments, the base system induction coil 1804, passive circuit induction coil 1803, and the electric vehicle induction coil 1816 may be fixed in position and the induction coils are brought within a near-field coupling region by overall placement of the electric vehicle (not shown) relative to the base wireless charging system 1802. As described above, the distance between the base system induction coil 1804 and the electric vehicle induction coil 1816 may be reduced to improve magnetic coupling. To accomplish this, in one exemplary embodiment, the base system induction coil 1804, passive circuit induction coil 1803, and electric vehicle induction coil 1816 may be displaceable (i.e., deployable or moveable) to bring each of the base system induction coil 1804, passive circuit induction coil 1803, and electric vehicle induction coil 1816 into better alignment.

Furthermore, the base wireless charging system 1802 (FIG. 18) may be configured to move automatically (e.g., as an automated robot), be controlled remotely (e.g., via a remote control unit), or through other methods for control of such a platform. For example, the electric vehicle 112 (FIG. 1) may request a charge (e.g., through an electric vehicle communication system 1874), whereupon the base charging system may move automatically underneath the electric vehicle and position itself to align the base system induction coil 1804 with the electric vehicle induction coil 1816. Further fine alignment (if necessary) may be accomplished through adjusting the position of the electric vehicle induction coil 1816, passive circuit induction coil 1803, and base system induction coil 1804 in one or more directions. Once sufficiently aligned, the base charging system 1802 may more efficiently transfer wireless power between a base charging system 1802 and an electric vehicle wireless power system 1814. After completion of charging or after some other event, the base wireless charging system 1802 may return back to a waiting position or standby mode. The base wireless charging system 1802 may further include cable management in order to uncoil and coil a connecting cable prior to and after the charging process.

An electric vehicle wireless power charging system 1814 may be further configured for safety and security concerns. For example, the electric vehicle 112 may be configured to be immobilized when the electric vehicle induction coil 1816, passive circuit induction coil 1803, or base system induction coil 1804 are deployed or when the induction coils cannot be retracted (e.g., due to damage or obstacle). Immobilization may protect the wireless power transfer system 1800 from additional damage. In another embodiment, the wireless power transfer system 1800 may include sensors that detect mechanical resistance of the electric vehicle induction coil 1816, passive circuit induction coil 1803, or base system induction coil 1804. The detection may protect the electric vehicle induction coil 1816, passive circuit induction coil 1803, or base system induction coil 1804 and accompanying components from being damaged if an obstacle (e.g., stone, debris, snow, animal, or the like) is positioned in a location that may restrict the movement of the induction coil.

The wireless power transfer system 1800 in an exemplary embodiment may include continuous monitoring of the wireless power link between the electric vehicle induction coil 1816 and base system induction coil 1804 (e.g., monitoring voltages, currents, power flow, or the like) and reduce the power transmitted or shut down power in the event of an abnormality in the wireless power link. In other embodiments, the wireless power transfer system 1800 may further include sensors configured to detect the presence of persons or animals in close proximity of the induction coil. Such sensors may enable a processor to reduce or terminate wireless power transmission if a person is proximate the wireless power induction coils. Such an action may be a safety precaution against prolonged exposure to electromagnetic radiation, such as for example, while a person performs maintenance or other repair work underneath an electric vehicle. Such a precaution may be particularly important to protect persons using cardiac pacemakers or similar sensitive and safety critical medical devices.

In one embodiment, the passive circuit induction coil 1803 may normally be stowed in an electric vehicle's underbody to be non-protrusive. When an electric vehicle 112 is parked for charging, the passive circuit induction coil 1803 may be lifted down in the z direction to a position between electric vehicle induction coil 1816 and base system induction coil 1803.

Minimum distance between coils may enable energy transfer at maximum efficiency and maximum power under regulatory constraints, so zero distance (coils touching) may be optimum. However, in a practical solution that needs to be robust, flexible, and reliable, a certain separation may be expected. The distance between coils may depend on several factors such as environmental (presence of dirt, debris, snow, mainly in an outdoor parking), embedding of base system induction coil 1804 in ground (below asphalt, flush, protrusive), housing of base system transmit circuitry and electric vehicle transmit circuitry, safety margin required to absorb sudden vertical displacements of vehicles suspension system (e.g., if a heavy person sits down in a car while the electric vehicle induction coil is deployed).

Figure 19A:
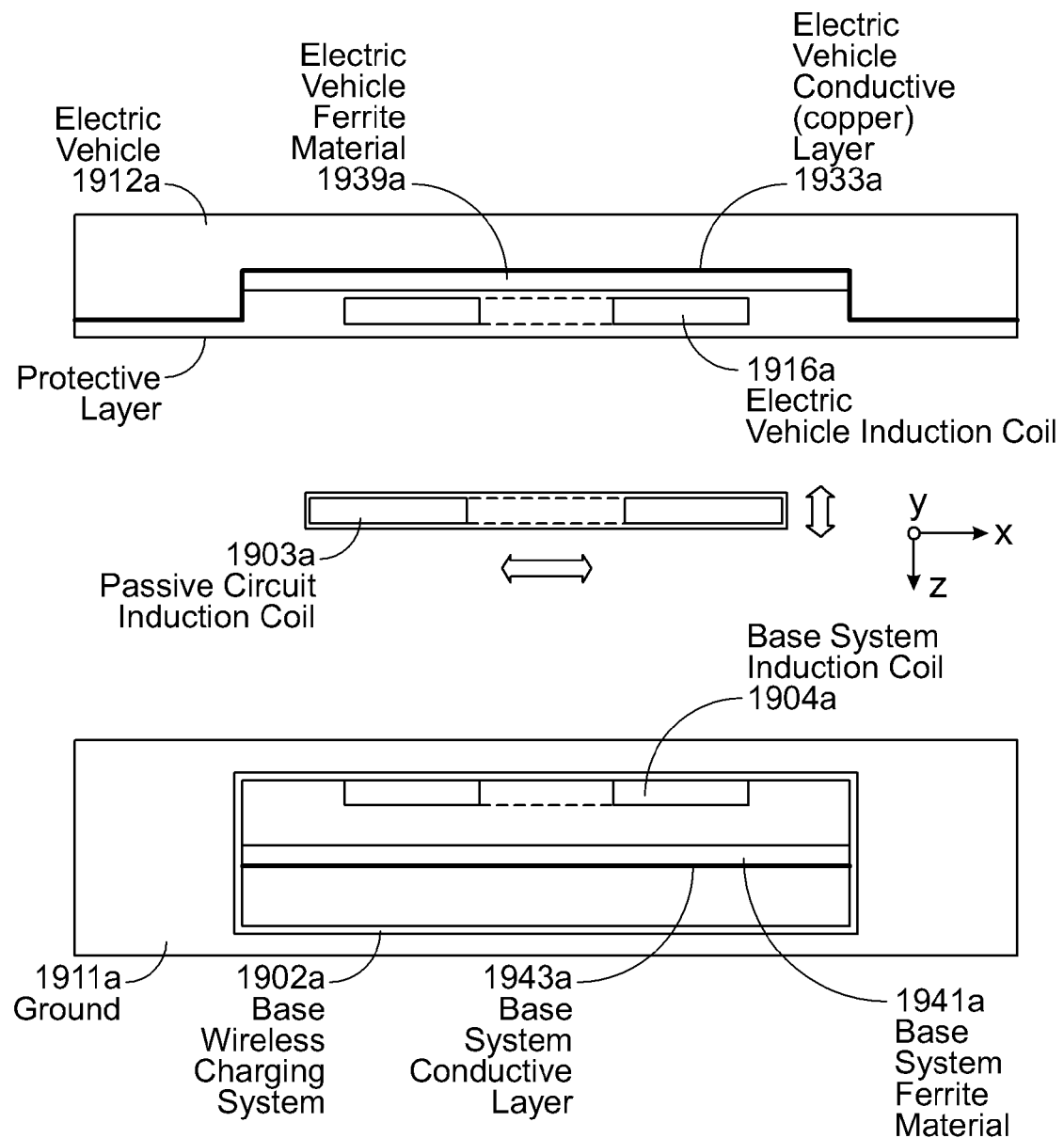
FIGS. 19A and 19B are diagrams of exemplary configurations for the placement of a passive circuit induction coil of a passive circuit in a wireless power transfer system.
Figure 19B:
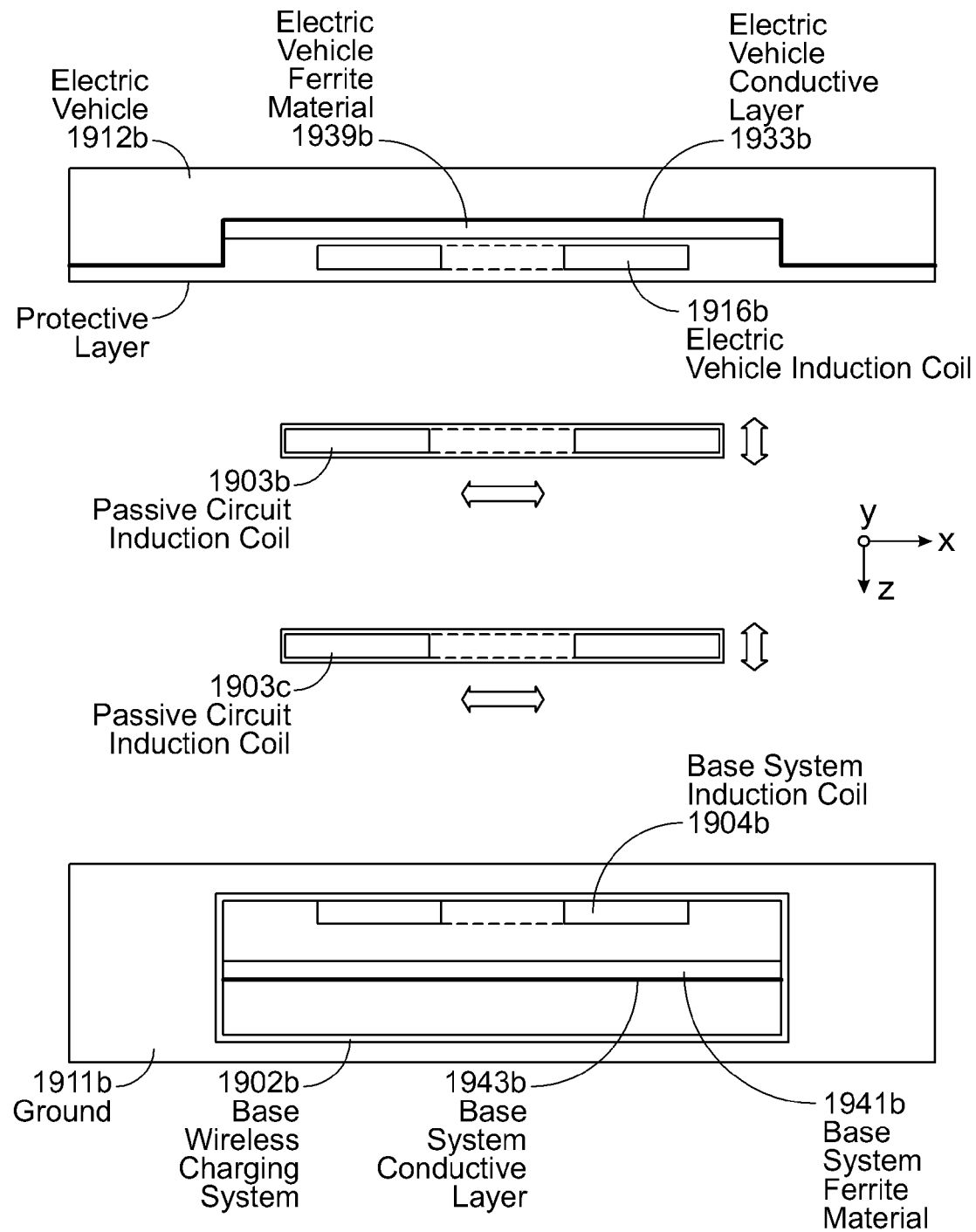

FIGS. 19A and 19B are diagrams of exemplary configurations for the placement of a passive circuit induction coil of a passive circuit in a wireless power transfer system. As shown in FIG. 19A, in an exemplary embodiment, a passive circuit induction coil 1903, also known as a "parasitic coil," or "parasitic antenna," or "parasitic resonator," may be inserted within a magnetic link to significantly increase magnetic coupling between a transmitting induction coil (e.g., base system induction coil 1904) and a receiving induction coil (e.g., electric vehicle induction coil 1916) thus improving transfer efficiency and reducing magnetic fields. The passive circuit induction coil 1903 in such an embodiment may be also considered as an energy relay that receives energy from a base system induction coil 1904a and relays it to an electric vehicle induction coil 1916a.

As shown in FIG. 19B, multiple passive circuit induction coils 1903b and 1903c may be positioned between the base system induction coil 1904b and electric vehicle induction coil 1916b. This arrangement may be referred to as multiple coupled parasitic resonance. In this system, there may be mutual coupling between each resonator 1904b, 1903c, 1903b, and 1916b. The system may be described by coupling coefficients (not shown) between every individual resonator 1904b, 1903c, 1903b, and 1916b and every other individual resonator 1904b, 1903c, 1903b, and 1916b.

Introducing one or more passive circuit induction coils may provide a system with a higher order coupled resonance. In some case, a multiple passive circuit induction coil system may be advantageous for handling emissions of harmonics included in transmitted waveforms and received (rectifier) waveforms.

Also shown in FIGS. 19A and 19B, magnetic shielding (e.g., electric vehicle ferrite material 1939a and 1939b and base system ferrite material 1941a and 1941b) may reduce eddy current losses in conductive layers (e.g., electric vehicle conductive layer 1933a and 1933b and base system conductive layer 1943a and 1943b) that may be used to prevent magnetic fields from penetrating into other components of the base wireless charging system 1902a and 1902b and into the electric vehicle 1912a and 1912b. Furthermore, magnetic shielding may increase coupling to the passive circuit induction coils 1903a, 1903b, and 1903c. The electric vehicle induction coils 1916a and 1916b may be fully embedded in a vehicle's underbody and may be fixed. The base wireless charging system 1902 may be located within the ground 1911.

In another embodiment, the passive circuit induction coils 1903a, 1903b, and 1903c may be larger in diameter than the base system induction coils 1904a and 1904b and electric vehicle induction coils 1916a and 1916b. This design may exhibit a higher Q-factor because the passive circuit induction coils 1903a, 1903b, and 1903c may be located at a favorable position further away from metallic surfaces of electric vehicles 1912a and 1912b and base wireless charging systems 1902a and 1902b. The passive circuit induction coils 1903a, 1903b, and 1903c may be the principal resonator of the magnetically coupled resonant system.

Parasitic resonance may provide some tolerance to lateral (x,y)-alignment errors of the electric vehicle induction coils 1916a and 1916b relative to base system induction coil 1904a and 1904b. One or more passive circuit induction coils 1903a, 1903b, and 1903c may be moved (e.g., mechanically displaced) to an optimum x,y-position to achieve maximum coupling between the electric vehicle induction coils 1916a and 1916b and base system induction coils 1904a and 1904b.

As such, the position of one or more passive circuit induction coils 1903a, 1903b, and 1903c (i.e., a parasitic resonator) positioned between a base system induction coil 1904a and 1904b (or any other resonant transmit induction coil) and an electric vehicle induction coil 1916a and 1916b (or any resonant receive induction coil) may be selectively adjusted. By repositioning passive circuit induction coils 1903a, 1903b, and 1903c the energy transfer rate may be controlled over some useful range without significantly compromising efficiency.

Figure 20A:
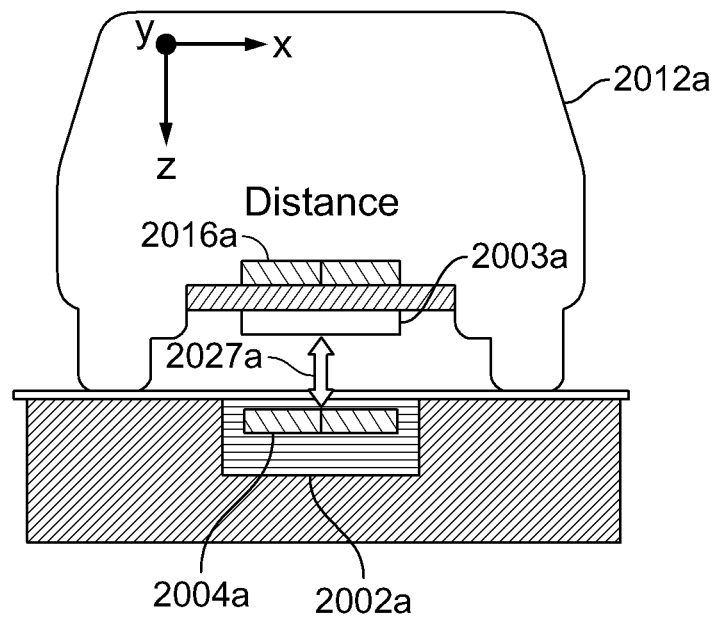
FIGS. 20A and 20B illustrate an electric vehicle positioned over a base wireless charging system for use with a passive circuit induction coil according to an exemplary embodiment of the present invention.
Figure 20B:
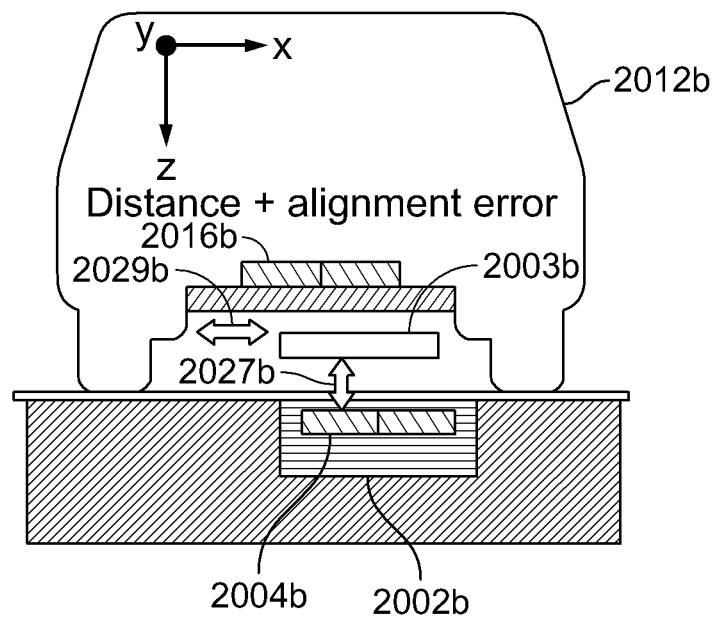

FIGS. 20A and 20B illustrate an electric vehicle positioned over a base wireless charging system for use with a passive circuit induction coil 2003a and 2003b according to an exemplary embodiment of the present invention. In FIG. 20A, an electric vehicle 2012a including an electric vehicle induction coil 2016a is positioned over a base wireless charging system 2002a also including a base system induction coil 2004a. The electric vehicle induction coil 2016a, passive circuit induction coil 2003a, and base system induction coil 2004a are aligned in the X and Y directions, and separated by a distance 2027a in the Z direction.

In FIG. 20B, the electric vehicle induction coil 2016b and the base system induction coil 2004b are misaligned by an offset distance 2029b in the X direction, and are separated by a distance 2027b in the Z direction. The distance 2023 and offset distance 2029b may be reduced in order to improve coupling strength between the electric vehicle induction coil 2016b and the base system induction coil 2004, via the passive circuit induction coil 2003b. The distance 2023b and the offset distance 2029b may be changed through an alignment adjustment system used to adjust the position of the passive circuit induction coil 2003b. The passive circuit induction coil 2003b may be positioned in concentric alignment with either the electric vehicle induction coil 2016b or base system induction coil 2004b or may be offset in the X, Y or Z directions from either the electric vehicle induction coil 2016b or base system induction coil 2004b.

In another exemplary embodiment, the alignment adjustment system may adjust the physical position of the base system induction coil 2004b, the passive circuit induction coil 2003b, the electric vehicle induction coil 2016b, or a combination thereof to increase coupling strength between the base system induction coil 2004b and the electric vehicle induction coil 2016b. The adjustment may be performed in response to a detected misalignment the base system induction coil 2004b, passive circuit induction coil 2003b, or electric vehicle induction coil 2016b relative to each other.

In yet another embodiment, information from a vehicle guidance system 1854 (FIG. 18) may be utilized to determine misalignment. Furthermore, information from a wireless power link (not shown), such as by using various parameters indicative of the performance of the wireless power link, may be used in other embodiments to determine misalignment of associated induction coils. During misalignment detection, the wireless power link may be operated at a reduced power level, but after associated induction coils have been accurately aligned, the power level may be increased.

The alignment adjustment system may be separated from, or in addition to, a more course alignment guidance system (not shown) in one embodiment. For example, a course alignment guidance system may guide an electric vehicle 2012b into a position within a given tolerance (i.e., error radius), such that an alignment adjustment system can correct for fine errors between the electric vehicle induction coil 2016b, passive circuit induction coil 2003b, and base system induction coil 2004b.

Figure 21:
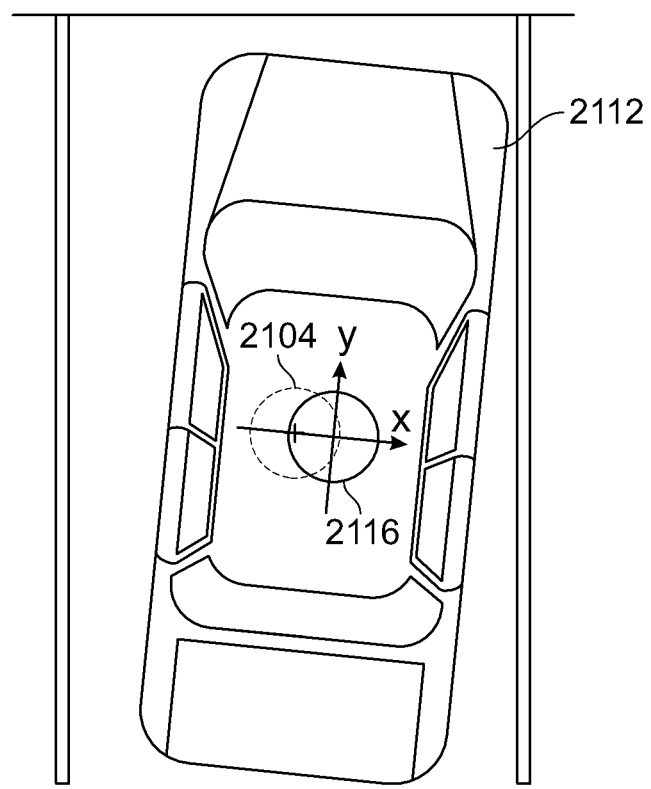
FIG. 21 is a diagram illustrating the use of a guidance system for aligning an electric vehicle charging system with a base wireless charging system according to an exemplary embodiment of the present invention.

FIG. 21 is a diagram illustrating the use of a guidance system for aligning an electric vehicle charging system with a base wireless charging system according to an exemplary embodiment of the present invention. As shown in FIG. 21, an electric vehicle induction coil 2116 and an base system induction coil 2104 are misaligned in the "X" direction. The electric vehicle induction coil 2116 and base system induction coil 2104 are aligned in the "Y" direction. For example, the Y direction alignment may have been accomplished by the electric vehicle 2112 using its own traction system, which may be assisted (e.g., auto-piloted) by the guidance system described herein, permitting a smooth and accurate targeting of a Y position. In such a scenario, alignment error in the X direction may still exist. Eliminating the need for alignment adjustment in the Y direction may further reduce space requirements for a passive circuit induction coil (not shown) since the passive circuit induction coil may be configured to move only in X direction, which may be accommodated in a cavity and not yet deployed for wireless power transfer.

Figure 22:
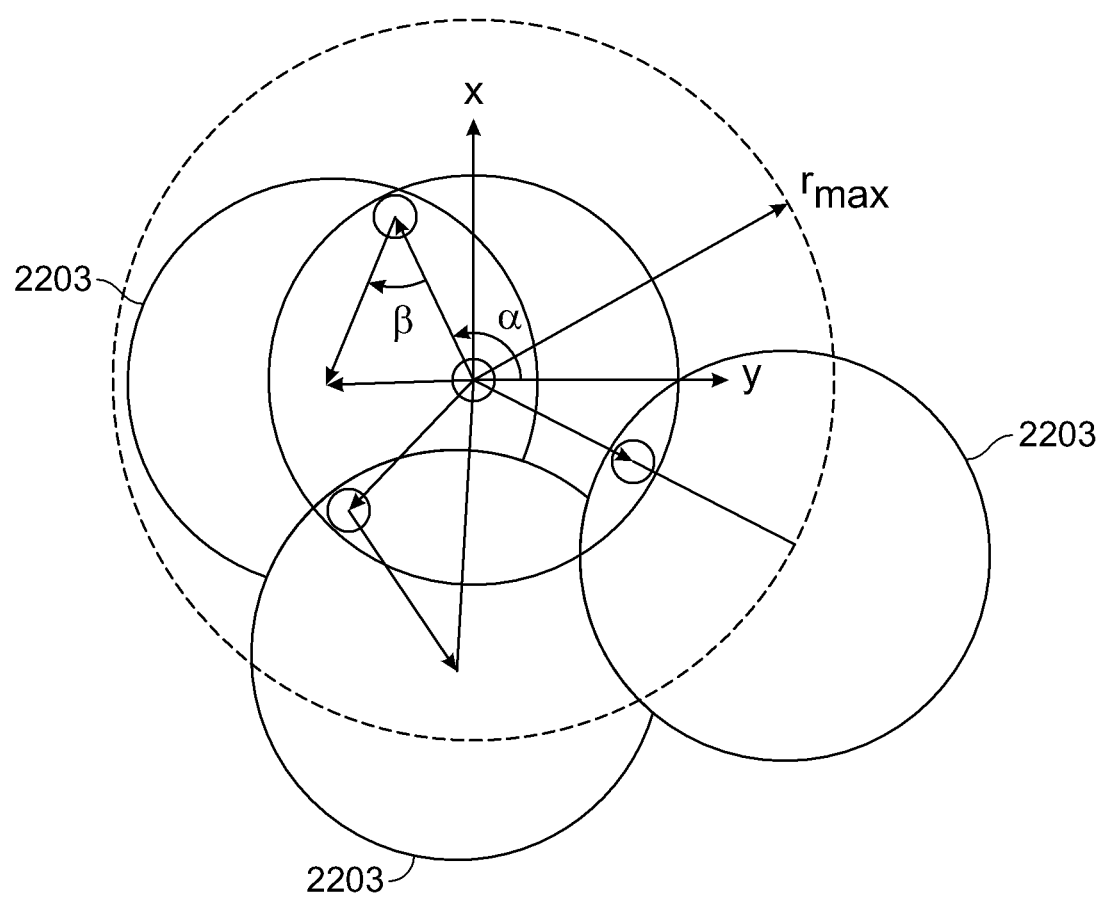
FIG. 22 illustrates possible locations in the X and Y direction for adjusting the position of a passive circuit induction coil according to an exemplary embodiment.

FIG. 22 illustrates possible locations in the X and Y direction for adjusting the position of a passive circuit induction coil 2203 according to an exemplary embodiment. A mechanical device (not shown) may select an angle pair (α, β) and accordingly move a passive circuit induction coil 2203 to any position in the X and Y direction within a radius $r_{max}$.

FIGS. 23A, 23B, and 23C illustrate mechanical devices which may be utilized to reposition a passive circuit induction coil 2303 within a wireless power transfer system 100. In FIG. 23A, a passive circuit induction coil 2303 may be located within a cavity 2317 of the underside of an electric vehicle 2312. A mechanical device 2350 may adjust the position of the passive circuit induction coil 2303 in the X and Y directions by selecting an appropriate angle pair (α, β). Additionally, mechanical device 2350 may adjust the position of the passive circuit induction coil 2303 in the Z direction by lowering the passive circuit induction coil 2303 from the cavity 2317 of the electric vehicle 2312. The mechanical device 2350 may include one of many mechanical devices including electric driven mechanics and/or hydraulics. Although not shown, a mechanical device may similarly be used to adjust the position of the electric vehicle induction coil 2316 or base system induction coil 2304 in the X, Y, or Z directions, or any combination thereof.

In FIGS. 23B and 23C, the passive circuit induction coil 2303 may be repositioned by a gear shaft 2351 operably coupled to a drive mechanism 2353 according to an exemplary embodiment of the present invention. In operation, if the drive mechanism 2353 is actuated, the gear shaft 2351 may be rotated to extend the support member 2355 in order to lower the passive circuit induction coil 2203 in the Z direction.

In another embodiment, fine alignment adjustment may also accomplished with the assistance of an electrical solution (e.g., electronically switched coil arrays) altering the flux lines of the electric field generated by a wireless power transmitter. A combination of mechanical and electrical alignment of the induction coils may also be used.

The passive circuit induction coil 2303 may be located along the underside of the chassis of an electric vehicle 2312. In one embodiment, a base wireless charging station may be configured as a platform located above the surface of the ground. Such a configuration may be desirable as a retrofit solution for a garage or carport if forming a hole in the ground for a charging base may be undesired. The base wireless charging system in yet another embodiment may also provide flexibility as a mobile charging platform that is able to be stored in one location, transferred to a different location, and used in another location.

Figure 24:
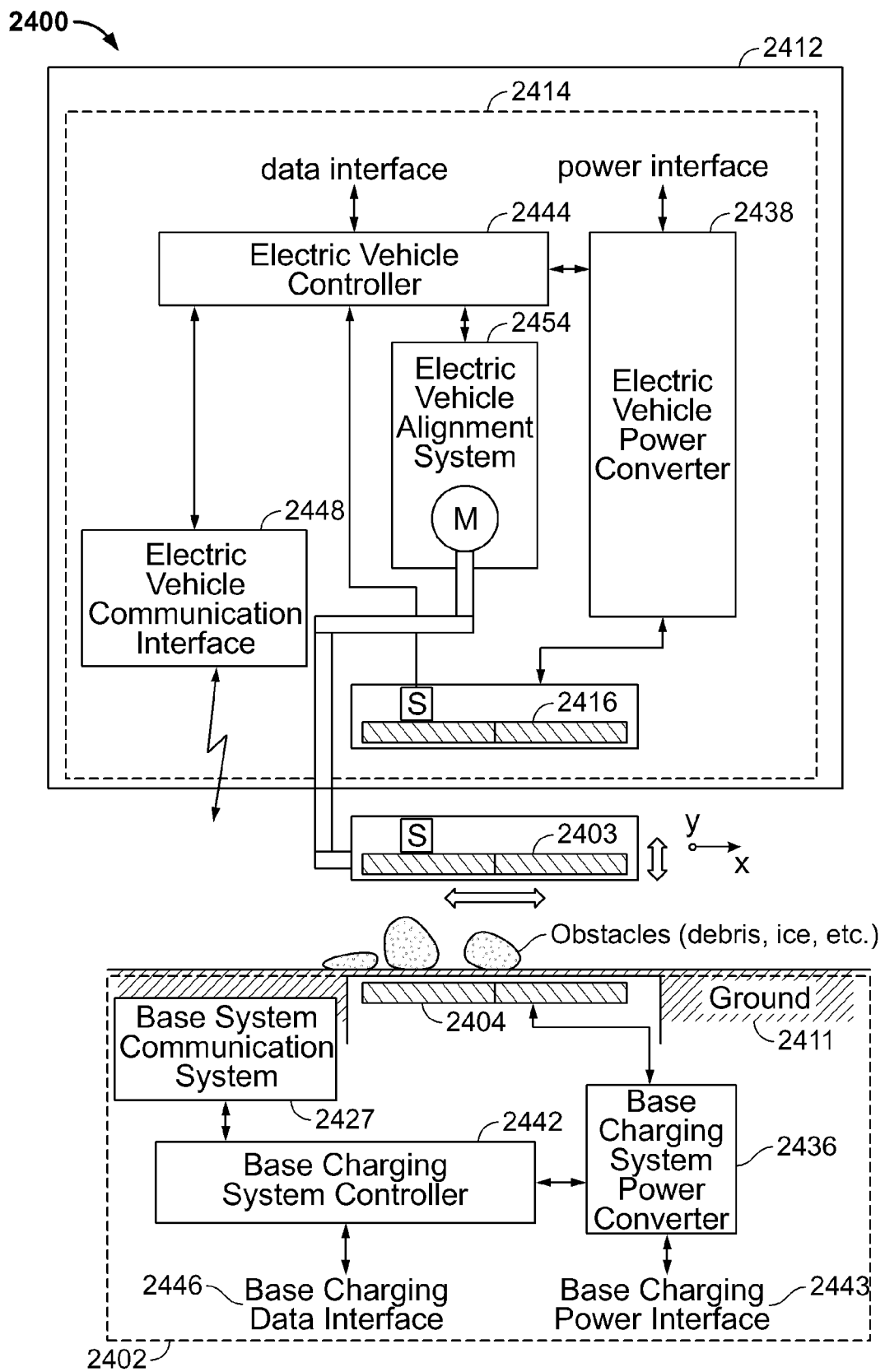
FIG. 24 is a functional block diagram of exemplary components for a wireless power transfer system for use with a passive circuit induction coil, in accordance with exemplary embodiments of the present invention.

FIG. 24 is a functional block diagram of exemplary components for a wireless power transfer system 2400 for use with a passive circuit induction coil 2403, in accordance with exemplary embodiments of the present invention. The wireless power transfer system 2400 may adapt to the actual conditions with an objective to minimize the distance (either actually or effectively) to maximize the efficiency of wireless power transfer. Separation of the base system induction coil 2404 and the passive circuit induction coil 2416 may be variable and may benefit from adapting certain link parameters to address maximum power, maximum efficiency and regulatory compliance.

The wireless power transfer system 2400 includes a base wireless charging system 2402 and an electric vehicle wireless charging system 2414. The base wireless charging system 2402 includes a base charging system power converter 2436 that may convert DC power or AC power at supply frequency into transmit power at operating frequency (e.g., LF) or vice versa in reverse mode of operation (vehicle-to-grid) via a base charging power interface 2434. The base charging system power converter 2436 may integrate several sensors (not shown) to measure voltages and currents. The base wireless charging system 2402 further includes a base system induction coil 2404 that may wirelessly transmit or receive power to/from the electric vehicle induction coil 2416. As shown in FIG. 24, the base system induction coil 2404 may be fixed and ground-embedded.

The base wireless charging system 2402 may also include a base system communication system 2427 that communicates with an electric vehicle 1612 via an electric vehicle communication interface 2448 to exchange system control data and also to identify or authenticate the electric vehicle 1612 or data that is generated by other applications directly or indirectly related to electric vehicle charging. As described above the base system communication system 2427 may use a dedicated antenna or use the base system induction coil 2404. The base wireless charging system 2402 also includes a base charging system controller 2442 that may process data received from via the electric vehicle communication interface 2448 and the various sensors of the base wireless charging system 2402 and may control the different entities of the base wireless charging system 2402.

The electric vehicle wireless charging system 2414 includes an electric vehicle power converter 2438 that may convert wirelessly received power received at an operating frequency (e.g., low frequency) into DC power or AC power at supply frequency or vice versa in reverse mode of operation (V2G). The electric vehicle power converter 2438 may include several sensors (not shown) to measure voltages and currents. The electric vehicle wireless charging system 2414 includes an electric vehicle induction coil 2403 that may wirelessly receive or transmit power from/to the base system induction coil 2404.

In one embodiment, the electric vehicle induction coil 2416 may be displaceable in an X, Y, Z-direction. In another embodiment, the electric vehicle induction coil 2416 may be fixed. The electric vehicle induction coil may also be integrated with at least one sensor (S) to detect unwanted objects like stones, debris, snow, ice, etc. that may constrain degree of freedom of base system induction coil 2404 e.g. to move to a low enough z-position. Sensors may include at least one of a mechanical resistance sensor integrated in induction coil mechanics, a tactile sensor at induction coil modules surface, an ultrasonic sensor, an optical sensor, and an electromagnetic sensor to detect metallic objects. If the electric vehicle induction coil 2416 is displaceable, an electric vehicle alignment system 2454 may be used to align the electric vehicle induction coil 2416 to the base system induction coil 2404 and to adjust distance for a desired coupling. The electric vehicle alignment system 2454 may include an actuator that may be a servo-motor (M) driving electric vehicle induction coil mechanics.

The electric vehicle wireless charging system 2414 may further include a passive circuit induction coil 2403 of passive circuit. The passive circuit induction coil 2403 may be used to "extend" the near coupling region between the base system induction coil 2404 and the electric vehicle induction coil 2416 as described above. The electric vehicle alignment system 2454 may be used to align the passive circuit induction coil 2403 to either the electric vehicle induction coil 2416 or the base system induction coil 2404. The electric vehicle alignment system 2454 may include an actuator that may be a servo-motor (M) driving passive circuit induction coil mechanics. The passive circuit induction coil 2403 may also be integrated with sensors as described above with reference to the electric vehicle induction coil 2416 to detect mechanical resistance. As such, the electric vehicle induction coil 3416 may be in a fixed position and any alignment and distance control may be accomplished via the passive circuit induction coil 2403. As the passive circuit including the passive circuit induction coil 2403 may not require any additional electrical connections, the mechanics of alignment may be simplified, especially where electrical cables or wires are not integrated with any mechanically displaceable components.

While FIG. 24 shows the passive circuit induction coil 2403 integrated with the electric vehicle 1612, it should be appreciated that the base wireless charging system 2402 may also include a passive circuit induction coil (not shown). As such the base wireless charging system 2402 may include a base system alignment system (not shown) that mechanically displaces (e.g., aligns) an integrated passive circuit induction coil similar to as described above with reference to the electric vehicle incorporating any sensors and motors needed. As such, either one or both of the electric vehicle wireless charging system 2414 or the base wireless charging system 2402 may include a passive circuit induction coil 2403.

The electric vehicle wireless charging system 2414 further includes an electric vehicle communication interface 2448 that may communicates with the base system communication system 2427 to exchange control data and also to identify or authenticate the electric vehicle 1612 or data that is generated by other application directly or indirectly related to electric vehicle charging. The electric vehicle communication interface 2448 may use a dedicated antenna or use the electric vehicle induction coil 2416. Furthermore, the electric vehicle wireless charging system 2414 includes an electric vehicle controller 2444 that may process data received from the base wireless charging system 2402 and the various sensors of the electric vehicle wireless charging system 2414 and may control the different entities of the electric vehicle wireless charging system 2414.

When performing the alignment process, transmit power may have to be reduced while the wireless power transfer system 2400 adjusts to a new distance/coupling coefficient. As such, the wireless power transfer system 2400 may throttle power in various ways for link adjustment purposes. Since power can be significantly reduced efficiency may less of an issue in this mode of operation.

If conditions permit and higher power (e.g., 4 kW) is desired, the wireless power transfer system 2400 may adjust to a defined coupling k' at distance d'. If something is detected that indicates that the conditions are inappropriate for higher power transfer (e.g., because objects on ground are detected by at least one of sensors (S) or if lower power (e.g. 2 kW) is desired), the wireless power transfer system 2400 may adjust to a weaker but defined coupling k"=k/2 at a larger distance d". Since the relationship between coupling coefficient and distance may differ to some degree, depending on local conditions, it may be desirable to measure coupling coefficient rather than relying on distance.

The electric vehicle controller 2444 may determine the coupling coefficient by using measurement data from voltage and current sensors of the electric vehicle power converter 2438 and the base charging system power converter 2436 that may be transmitted from the base charging system controller 2442 to the electric vehicle controller 2444 via a communication link. Knowing link parameters (e.g., $L_1, C_1, R_1, L_2, C_2$, and $R_2$), the operating frequency, and various parameters of power conversion, the coupling coefficient k(d) may be derived with e.g. from the system of equations of the resonant inductive link shown below in Equation 42.

$$V_1 - R_1 I_1 - j\left(\omega L_1 - \frac{1}{\omega C_1}\right)I_1 - j\omega M I_2 = 0$$

$$V_2 - R_1 I_2 - j\left(\omega L_2 - \frac{1}{\omega C_2}\right)I_2 - j\omega M I_2 = 0$$

Equation 42

Based on these derived values, the electric vehicle alignment system 2454 may align induction coils 2403 and 2416 accordingly. Once adjusted to achieve the desired coupling (i.e., one of the two target coupling coefficients (k' or k")), the base charging system power converter 2436 and the electric vehicle power converter 2438 may be configured to full-bridge mode (in case of k') or half-bridge mode (in case of k") and power may be ramped up to maximum power that is permissible at this target coupling coefficients (e.g., 4 kW or 2 kW, respectively).

In another embodiment, if measured coupling coefficient is above a threshold, power conversion may be configured to a full-bridge mode. Conversely, if a derived coupling coefficient is equal or below that threshold, power conversion may be configured to half-bridge mode. This threshold may be defined somewhere halfway between the two target coupling coefficients (e.g. at a value where both full-bridge mode and half-bridge mode would perform equally well). However, operating the system at a coupling coefficient considerably deviating from the two target coupling coefficients may require additional means to control power, efficiency, and emission levels as described above.

Operation at defined coupling coefficients k' and k" in either full-bridge or half-bridge mode, respectively, may provide improved energy transfer at maximum efficiency with lowest complexity in power conversion. Fine control to precisely adjust power to nominal power can be achieved by lowering or increasing coupling slightly or by another method that does not noticeably degrade efficiency. The fine control and adjustment based on target coupling coefficients may be accomplished via displacing/aligning the passive circuit induction coil 2403 as described above.

Figure 25:
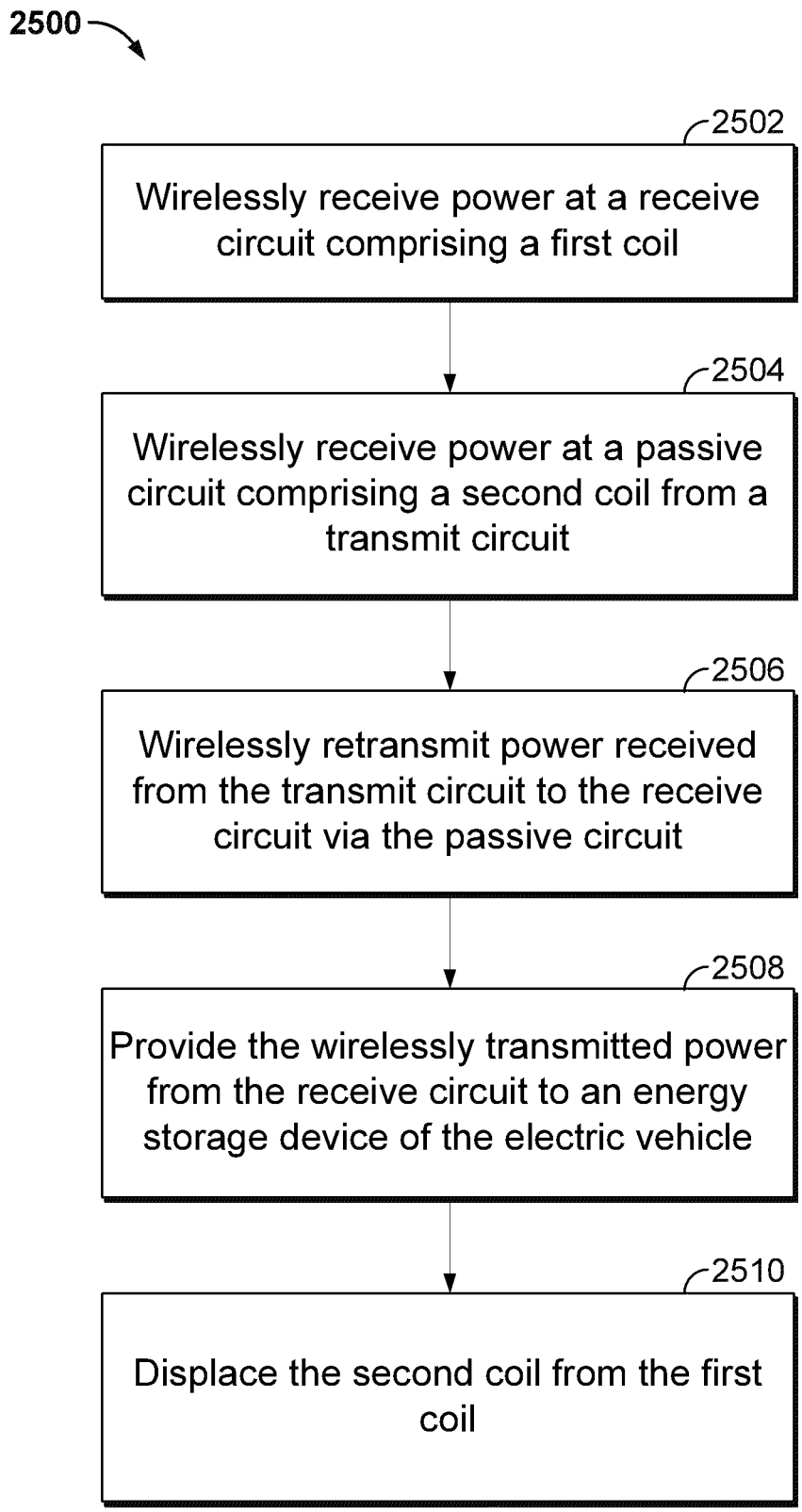
FIG. 25 is a flowchart of an exemplary method for wirelessly transferring power between a transmit circuit and an electric vehicle, in accordance with an exemplary embodiment of the invention.

FIG. 25 is a flowchart of an exemplary method 2500 for wirelessly transferring power between a transmit circuit and an electric vehicle, in accordance with an exemplary embodiment of the invention. In block 2502, an electric vehicle 2412 may wirelessly receive power at a receive circuit comprising a first coil. In block 2504, the electric vehicle 2412 may wirelessly receive power at a passive circuit including a second coil 2403 from a transmit circuit. In block 2506, the passive circuit may wirelessly retransmit power received from the transmit circuit to the receive circuit via the passive circuit. In block 2508, the receive circuit may provide the wirelessly transmitted power to an energy storage device of the electric vehicle 2412. In block 2510, the electric vehicle 2412 may selectively displace the second coil 2403 from the first coil 2608. As described above the electric vehicle 2412 may displace the second coil 2403 to improve coupling between the first coil 2416 and a third coil 2404 of the transmit circuit.

Figure 26:
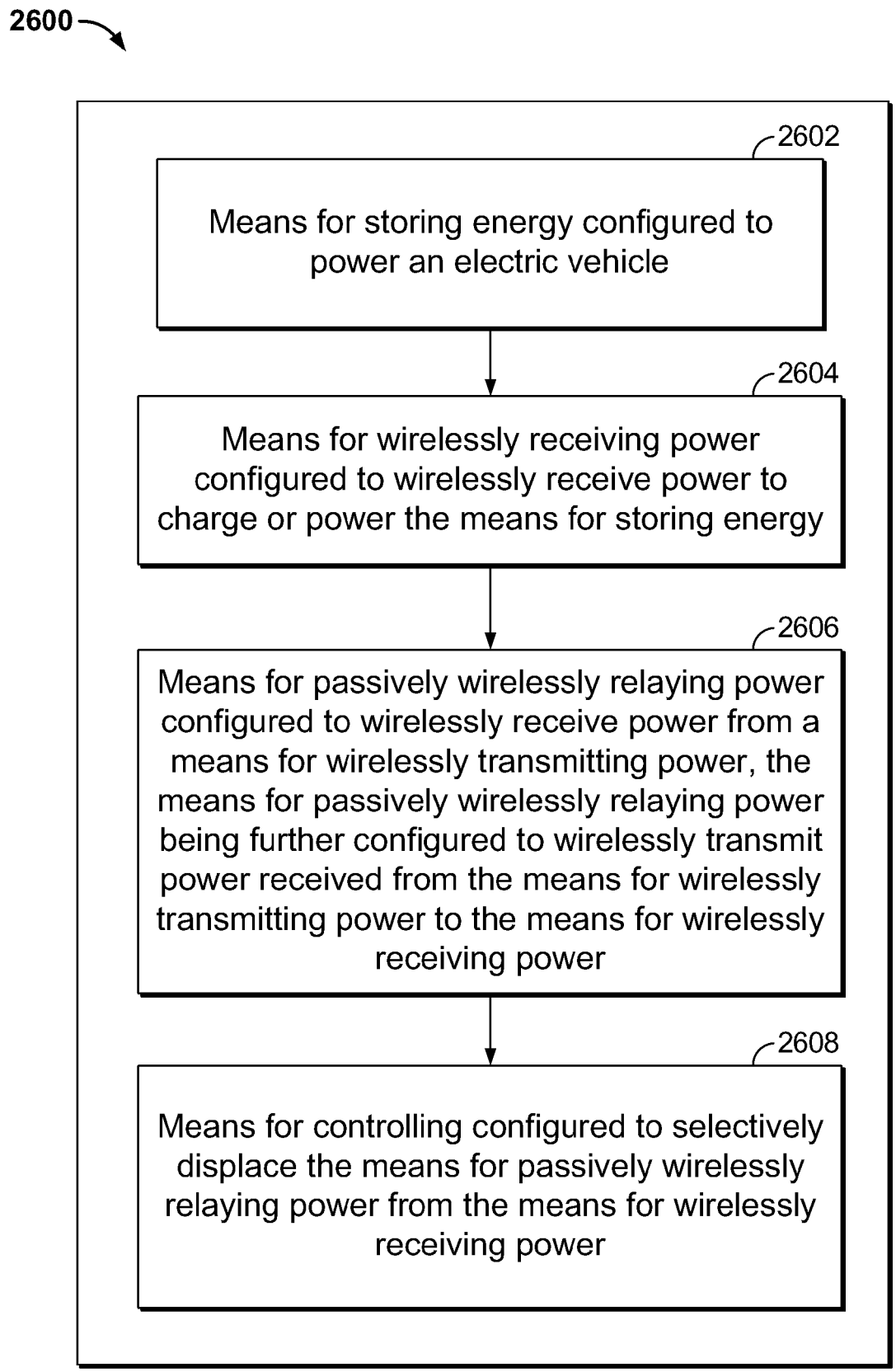
FIG. 26 is a functional block diagram of a wireless power receiver, in accordance with an exemplary embodiment of the invention.

FIG. 26 is a functional block diagram of a wireless power receiver, in accordance with an exemplary embodiment of the invention. Device 2600 includes means 2602, 2604, 2606, and 2608 for the various actions discussed with respect to FIGS. 1-25.

The various operations of methods described above may be performed by any suitable means capable of performing the operations, such as various hardware and/or software component(s), circuits, and/or module(s). Generally, any operations illustrated in FIGS. 1-25 may be performed by corresponding functional means capable of performing the operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer readable medium. Computer readable media includes both computer storage media and communication media including any medium that facilitates transfer of a computer program from one place to another. A storage media may be any available media that may be accessed by a computer. By way of example, and not limitation, such computer readable media may comprise RAM, ROM, EEPROM, CD ROM or other optical disk storage, magnetic disk storage or other magnetic storage devices, or any other medium that may be used to carry or store desired program code in the form of instructions or data structures and that may be accessed by a computer. Also, any connection is properly termed a computer readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A wireless power receiver apparatus for powering or charging an electric vehicle, comprising:
    a receive circuit comprising a first coil, the receive circuit being configured to wirelessly receive power so as to power or charge the electric vehicle;
    a passive circuit comprising a second coil, the passive circuit being configured to wirelessly receive power from a transmit circuit comprising a third coil, the passive circuit being further configured to wirelessly retransmit power received from the transmit circuit to the receive circuit; and
    a controller configured to:
        detect misalignment between the third coil of the transmit circuit and the first coil, and
        displace the second coil from the first coil in response to the detecting.

2. The wireless power receiver apparatus of claim 1, wherein the first coil and the second coil are substantially coplanar according to a first configuration.

3. The wireless power receiver apparatus of claim 1, wherein the passive circuit has a capacitance and an inductance, and wherein the passive circuit is configured to resonate at a frequency based on the capacitance and the inductance.

4. The wireless power receiver apparatus of claim 1, wherein the passive circuit comprises a self-resonant coil.

5. The wireless power receiver apparatus of claim 1, wherein the receive circuit and the passive circuit are configured to resonate at substantially a common frequency.

6. The wireless power receiver apparatus of claim 1, wherein the passive circuit is a first passive circuit, wherein the transmit circuit further comprises a second passive circuit comprising a fourth coil, and wherein the second passive circuit is configured to wirelessly retransmit power received from the transmit circuit to the first passive circuit.

7. The wireless power receiver apparatus of claim 1, wherein the second coil is housed within a cavity in an underside portion of the electric vehicle.

8. The wireless power receiver apparatus of claim 1, wherein the passive circuit is coupled to an electric vehicle only via a mechanical coupling.

9. A method for wirelessly transferring power between a transmit circuit and an electric vehicle, comprising:
    wirelessly receiving power at a receive circuit comprising a first coil;
    wirelessly receiving power at a passive circuit comprising a second coil from the transmit circuit;
    wirelessly retransmitting power received from the transmit circuit to the receive circuit via the passive circuit;
    providing the wirelessly transmitted power from the receive circuit to an energy storage device of the electric vehicle;
    detecting misalignment between a third coil of the transmit circuit and the first coil; and
    displacing the second coil from the first coil in response to the detecting.

10. The method of claim 9, wherein the first coil and the second coil are substantially coplanar according to a first configuration.

11. The method of claim 9, wherein the passive circuit comprises a self-resonant coil.

12. The method of claim 9, wherein the passive circuit is a first passive circuit, and wherein wirelessly receiving power comprises wirelessly receiving power from a second passive circuit of the transmit circuit.

13. The method of claim 9, wherein the second coil is housed within a cavity in an underside portion of the electric vehicle.

14. The method of claim 9, wherein the passive circuit is coupled to an electric vehicle only via a mechanical coupling.

15. A wireless power receiver apparatus for powering or charging an electric vehicle, comprising:
    means for wirelessly receiving power configured to wirelessly receive power so as to power or charge the electric vehicle;
    means for passively wirelessly relaying power configured to wirelessly receive power from a means for wirelessly transmitting power, the means for passively wirelessly relaying power being further configured to wirelessly retransmit power received from the means for wirelessly transmitting power to the means for wirelessly receiving power; and means for controlling configured to displace the means for passively wirelessly relaying power from the means for wirelessly receiving power in response to a detection of misalignment between the means for wirelessly transmitting power and the means for wirelessly receiving power.

16. The wireless power receiver apparatus of claim 15, wherein the means for wirelessly receiving power and the means for passively wirelessly relaying power are substantially coplanar according to a first configuration.

17. The wireless power receiver apparatus of claim 15, wherein the means for passively wirelessly relaying power comprises a self-resonant coil.

18. The wireless power receiver apparatus of claim 15, wherein the means for passively wirelessly relaying power is a first means for passively wirelessly relaying power, the means for wirelessly transmitting further comprising a second means for passively wirelessly relaying power, the second means for passively wirelessly relaying power configured to wirelessly retransmit power received from the means for wirelessly transmitting to the first means for passively wirelessly relaying power.

19. The wireless power receiver apparatus of claim 15, wherein the means for passively wirelessly relaying power is housed within a cavity in an underside portion of the electric vehicle.

20. The wireless power receiver apparatus of claim 15, wherein the means for passively wirelessly relaying power is coupled to an electric vehicle only via a mechanical coupling.

21. The wireless power receiver apparatus of claim 15, wherein the means for wirelessly receiving power comprises a receive circuit comprising a first coil, wherein the means for passively wirelessly relaying power comprises passive circuit comprising a second coil, and wherein the means for wirelessly transmitting power comprises a transmit circuit.

22. The wireless power receiver apparatus of claim 15, wherein the means for controlling comprises a controller.

23. A wireless power transmitter apparatus for powering or charging an electric vehicle, comprising:
a transmit circuit comprising a first coil, the transmit circuit configured to wirelessly transmit power;
a passive circuit comprising a second coil, the passive circuit being configured to wirelessly receive power from the transmit circuit, the passive circuit being further configured to wirelessly retransmit power received from the transmit circuit to a receive circuit, the receive circuit comprising a third coil and configured to provide power so as to power or charge the electric vehicle; and
a controller configured to displace the second coil from the first coil in response to a detection of misalignment between the first coil and the third coil.

24. The wireless power transmitter apparatus of claim 23, wherein the first coil and the second coil are substantially coplanar according to a first configuration.

25. The wireless power transmitter apparatus of claim 23, wherein the passive circuit comprises a self-resonant coil.

26. The wireless power transmitter apparatus of claim 23, wherein the transmit circuit and the passive circuit are configured to resonate at substantially a common frequency.

27. The wireless power transmitter apparatus of claim 23, wherein the passive circuit is a first passive circuit, the receive circuit further comprising a second passive circuit comprising a fourth coil, the second passive circuit configured to wirelessly receive power from the first passive circuit.

28. A method for wirelessly transferring power between a transmit circuit and an electric vehicle, comprising:
wirelessly transmitting power from a transmit circuit comprising a first coil;
wirelessly receiving power at a passive circuit comprising a second coil from the transmit circuit;
wirelessly retransmitting the wirelessly received power to a receive circuit comprising a third coil via the passive circuit so as to provide power to power or charge the electric vehicle;
detecting misalignment between the first coil and a third coil of the receive circuit; and
displacing the second coil from the first coil in response to the detecting.

29. The method of claim 28, wherein the first coil and the second coil are substantially coplanar according to a first configuration.

30. The method of claim 28, wherein the passive circuit comprises a self-resonant coil.

31. The method of claim 28, wherein the passive circuit is a first passive circuit, and wherein wirelessly transmitting power comprises wirelessly transmitting power to a second passive circuit of the receive circuit via the first passive circuit.

32. A wireless power transmitter apparatus for powering or charging an electric vehicle, comprising:
means for wirelessly transmitting power;
means for passively wirelessly relaying power configured to wirelessly receive power from the means for wirelessly transmitting power, the means for passively wirelessly relaying power being further configured to wirelessly retransmit power received from the means for wirelessly transmitting power to a means for wirelessly receiving power, the means for wirelessly receiving power configured to provide power so as to power or charge the electric vehicle; and
means for controlling configured to displace the means for passively wirelessly relaying power from the means for wirelessly transmitting power in response to a detection of misalignment between the means for wirelessly transmitting power and the means for wirelessly receiving power.

33. The wireless power transmitter apparatus of claim 32, wherein the means for wirelessly transmitting power and the means for passively wirelessly relaying power are substantially coplanar according to a first configuration.

34. The wireless power transmitter apparatus of claim 32, wherein the means for passively wirelessly relaying power comprises a self-resonant coil.

35. The wireless power transmitter apparatus of claim 32, wherein the means for passively wirelessly relaying power is a first means for passively wirelessly relaying power, the means for wirelessly receiving power further comprising a second means for passively wirelessly relaying power, the second means for passively wirelessly relaying power configured to wirelessly receive power from the first means for passively wirelessly relaying power.

36. The wireless power transmitter apparatus of claim 32, wherein the means for wirelessly transmitting power comprises a transmit circuit comprising a first coil, wherein the means for passively wirelessly relaying power comprises a passive circuit comprising a second coil, and wherein the means for wirelessly receiving power comprises a receive circuit.

37. The wireless power transmitter apparatus of claim 32, wherein the means for controlling comprises a controller.

* * * * *